US007266783B2

(12) United States Patent
Fujita et al.

(10) Patent No.: US 7,266,783 B2
(45) Date of Patent: Sep. 4, 2007

(54) DISPLAYING PLURAL LINKED INFORMATION OBJECTS IN VIRTUAL SPACE IN ACCORDANCE WITH VISUAL FIELD

(75) Inventors: Takushi Fujita, Kawasaki (JP); Toru Kamiwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 388 days.

(21) Appl. No.: 09/961,147

(22) Filed: Sep. 24, 2001

(65) Prior Publication Data

US 2002/0180808 A1 Dec. 5, 2002

(30) Foreign Application Priority Data

May 30, 2001 (JP) ............................. 2001-162322

(51) Int. Cl.
*G06F 3/048* (2006.01)
(52) U.S. Cl. ..................................... 715/848
(58) Field of Classification Search ........ 345/848–852, 345/838–839, 417, 760; 715/501, 503, 845–852, 715/760, 747
See application file for complete search history.

(56) References Cited

U.S. PATENT DOCUMENTS

| 5,295,243 | A | * | 3/1994 | Robertson et al. .......... 715/848 |
| 5,684,969 | A | * | 11/1997 | Ishida .......................... 715/800 |
| 5,778,372 | A | | 7/1998 | Cordell et al. |
| 6,049,795 | A | | 4/2000 | Kamiwada et al. |
| 6,088,032 | A | * | 7/2000 | Mackinlay .................... 345/848 |
| 6,147,703 | A | * | 11/2000 | Miller et al. .............. 348/220.1 |
| 6,486,895 | B1 | * | 11/2002 | Robertson et al. .......... 345/776 |
| 6,549,944 | B1 | * | 4/2003 | Weinberg et al. ............ 709/224 |
| 6,608,640 | B1 | * | 8/2003 | Nagahara et al. ........... 345/848 |
| 6,650,343 | B1 | | 11/2003 | Fujita et al. |
| 6,681,370 | B2 | * | 1/2004 | Gounares et al. ............ 715/513 |
| 6,683,990 | B2 | * | 1/2004 | Yagishita et al. ............ 382/239 |
| 6,724,407 | B1 | * | 4/2004 | Cheng ........................ 345/848 |
| 6,877,135 | B1 | | 4/2005 | Kamiwada et al. |

OTHER PUBLICATIONS

Patent Abstracts of Japan of JP 11-024878 published Jan. 29, 1999.
Patent Abstracts of Japan of JP 2000-207269 published Jul. 28, 2000.
Patent Abstracts of Japan of JP 2001-060166 published Mar. 6, 2001.

(Continued)

*Primary Examiner*—Kristine Kincaid
*Assistant Examiner*—Thanh Vu
(74) *Attorney, Agent, or Firm*—Staas & Halsey LLP

(57) ABSTRACT

For easier access to a desired one of information objects for displaying by traversing links between them, an information processing apparatus includes holding means which holds content type specific intermediate data generating means and content type specific display image generating means both in an executable condition. The apparatus includes first means which causes the intermediate data generating means to generate intermediate data for displaying an information object in accordance with a geometric relation of the object to a visual field. The apparatus also includes second means which causes the display image generating means to generate a display image of the object from the intermediate data in accordance with the geometric relation of the object to the field. The intermediate data generating means and the display image generating means operate asynchronously with each other.

24 Claims, 16 Drawing Sheets

OTHER PUBLICATIONS

Patent Abstracts of Japan of JP 2000-172248 published Jun. 23, 2000.

Rick Gessner, "Netscape's Gecko—The Next-Generation Layout Engine," Web Techniques, XP002166474, Mar. 1999, the whole document (11 pages).

First Office Action issued on Aug. 22, 2006 by the Japanese Patent Office in Japanese Application No. 2001-162322 which corresponds to the present pending U.S. patent application, "No Translation".

* cited by examiner

DISPLAYING PLURAL LINKED INFORMATION OBJECTS IN VIRTUAL SPACE IN ACCORDANCE WITH VISUAL FIELD

FIELD OF THE INVENTION

This invention relates to displaying linked information objects in a virtual space and, more particularly, to displaying a plurality of linked information contents disposed in a virtual space.

BACKGROUND OF THE INVENTION

A typical example of prior art information content display means is Microsoft Internet Explorer®, a browser of Microsoft Corporation. This browser is arranged such that a plurality of successively linked hypertext contents such as HTML documents can be displayed on one window on a computer display screen. When a mouse is clicked on a displayed content at a location where linking to other content is defined, the other content to be linked to is displayed on the same window as or on a different window from the window on which the first content is displayed. With this browser, when one content changes to another linked content, change of the displayed images is not continuous. Therefore, it is difficult for a user to understand the relations between successively linked contents, and, sometimes the user tends to become at a loss where in the linkage he or she is.

The inventors have proposed means for solving the above-described problems. Specifically, they disclosed "APPLICATION PROGRAM STARTING METHOD, RECORDING MEDIUM ON WHICH SAID APPLICATION PROGRAM IS RECORDED, AND COMPUTER SYSTEM" in Japanese Unexamined Patent Publication No HEI 11-24878 A laid open for public inspection on Jan. 29, 1999, which corresponds to U.S. patent application Ser. No. 08/974,246 filed on Nov. 19, 1997; "ELECTRONIC INFORMATION DISPLAYING METHOD, ELECTRONIC INFORMATION BROWSING APPARATUS AND ELECTRONIC INFORMATION BROWSING PROGRAM RECORDING MEDIUM" in Japanese Unexamined Patent Publication No. 2000-172248 A laid open for public inspection on Jun. 23, 2000, which corresponds to U.S. Ser. No. 09/407,376 filed on Sep. 28, 1999; "DOCUMENT DISPLAY APPARATUS AND METHOD FOR DISPLAYING DOCUMENTS" in Japanese Unexamined Patent Publication No. 2000-207269 A laid open for public inspection on Jul. 28, 2000, which corresponds to U.S. Ser. No. 09/473,049 filed on Dec. 28. 1999; and "DOCUMENT BROWSING SYSTEM, AND DATA READ-IN APPARATUS AND DOCUMENT DISPLAY APPARATUS FOR USE IN DOCUMENT BROWSiNG SYSTEM" in Japanese Unexamined Patent Publication No. 2001-60166 A laid open for public inspection on Mar. 6, 2001. These publications disclose a technique enabling browsing successively linked information contents by traversing the linkage by smoothly moving a viewpoint, whereby a user can instantly understand the linkage between the contents during browsing.

However, with the techniques disclosed in the Japanese publications cited above, depending on system conditions or content conditions, it is frequently impossible to smoothly change the images by shifting a visual field, in such a case that the wait state occurs due to reading in content data or an amount of processing increases to thereby lessen the processing capacity for the purpose when the content data is read in. Furthermore, since content data reading and display preparation procedures of the systems are not optimized, it frequently takes a long time until a desired content is displayed. Also, there remain undeveloped areas in methods for displaying, on the same display screen, different types of contents including three-dimensional images and moving images or for enabling contents of additional types to be displayed.

An object of the present invention is to provide means which enables easier attainment of a desired one of information objects, in displaying the linked information objects in an information processing apparatus, by traversing the links between successively linked information objects.

Another object of the invention is to provide smoother image change with visual field shifting in displaying linked information objects in an information processing apparatus.

Still another object of the invention is to reduce time required for a desired content to be displayed.

Further objects of the invention are to enable different types of contents to be displayed, to provide integrating means for displaying different types of contents, and to facilitate an additional type of content to be displayed.

SUMMARY OF THE INVENTION

According to one aspect of the present invention, an information processing apparatus displays a plurality of linked information objects in a virtual space in accordance with visual field data. One of the information objects represents a content of one content type. The visual field data defines a visual field in the virtual space. The information processing apparatus includes hold means and first and second means. The hold means holds, in an executable condition, intermediate data generating means specific to the content type and display image generating means specific to the content type. The first means causes the intermediate data generating means to generate intermediate data for displaying the one information object, when it is determined, from the geometric relation between the visual field and the one information object, that the intermediate data of the one information object should be generated. The second means causes the display image generating means to generate a display image of the one information object based on the generated intermediate data, when it is determined, from the geometric relation between the visual field and the one information object, that the display image of the one information object should be generated.

According to another feature of the invention, the hold means of the information processing apparatus holds at least one content type specific data processing means in an executable state. The data processing means includes the intermediate data generating means, the display image generating means, capturing means specific to the content type for capturing content data of the one information object, and deleting means specific to the content type for deleting the generated intermediate data in an intermediate data memory.

The information processing apparatus may include third means for selecting one of the information objects as a representative object and defining the visual field by defining the geometric relation between the visual field and the representative object. The third means changes the representative object in response to the movement of the visual field in the virtual space, without changing the geometric relation of the plural information objects to the visual field. The first means traverses links between the information objects, starting from the representative object, and determines whether or not the intermediate data of the one information object should be generated.

The information processing apparatus may include further a memory region and memory managing means. Display data, including intermediate data for displaying the plurality of information objects, is stored in the memory region. The memory managing means determines the amount of the memory region occupied by the display data and deletes sequentially at least part of the intermediate data in the memory region which has not been used for the longest time for display image generation each time it determines that the amount occupied by the display data is larger than a predetermined threshold.

According to another aspect of the invention, a program for use in an information processing apparatus is provided for displaying a plurality of linked information objects in a virtual space in accordance with a visual field data. One of the plural information objects represents a content of a certain content type. The visual field data defines a visual field in the virtual space. The information processing apparatus includes a hold region which holds, in an executable condition, a program specific to the content type for causing an intermediate data generating step and a display image generating step to be executed. The intermediate data generating step is for generating intermediate data specific to the content type, and the display image generating step is for generating, from the generated intermediate data, a display image specific to the content type. The first program includes a step of generating an intermediate data for displaying the one information object by means of the intermediate data generating step, when it is determined, from the geometric relation between the visual field and the one information object, that the intermediate data for the one information object should be generated. The first program further includes a step of generating, from the generated intermediate data, a display image of the one information object by means of the display image generating step, when it is determined, from the geometric relation between the visual field and the one information object, that the one information object should be displayed.

According to the invention, in displaying linked information objects in an information processing apparatus, it is easier to reach a desired one of the linked information objects by traversing the links between the information objects.

According to the invention, smoother image change with shift of a visual field can be realized in displaying linked information object in an information processing apparatus.

According to the invention, time required for a desired content to be displayed can be reduced.

According to the invention, the different types of contents can be displayed, displaying different types of contents can be realized by integrating means, and displaying additional types of contents is also facilitated.

According to the invention, in displaying information contents existing in a memory device of a computer and in a computer and the like which may be connected to networks, such as the Internet, a desired one of a vast amount of linked information contents, such as HTML texts in WWW, can be readily reached by traversing the links. Specifically, a visual field is smoothly moved over a plurality of linked contents displayed on the same one display, to thereby traverse the linkage, and the contents are displayed in accordance with the visual field, whereby a large amount of information can be browsed comfortably by continuously moving the visual field.

PREFERRED EMBODIMENT OF THE INVENTION

The present invention is described by an example of displaying a plurality of linked information objects disposed in a three dimensional virtual space. An information object visually and/or audibly represents any information content treated as a unit in a virtual space, e.g. one text document, one document including text and graphics, one image, a stream of moving images, one three-dimensional image formed of plural parts, or an audio stream. Such an information object may be dynamically generated by a program.

Figure 1:
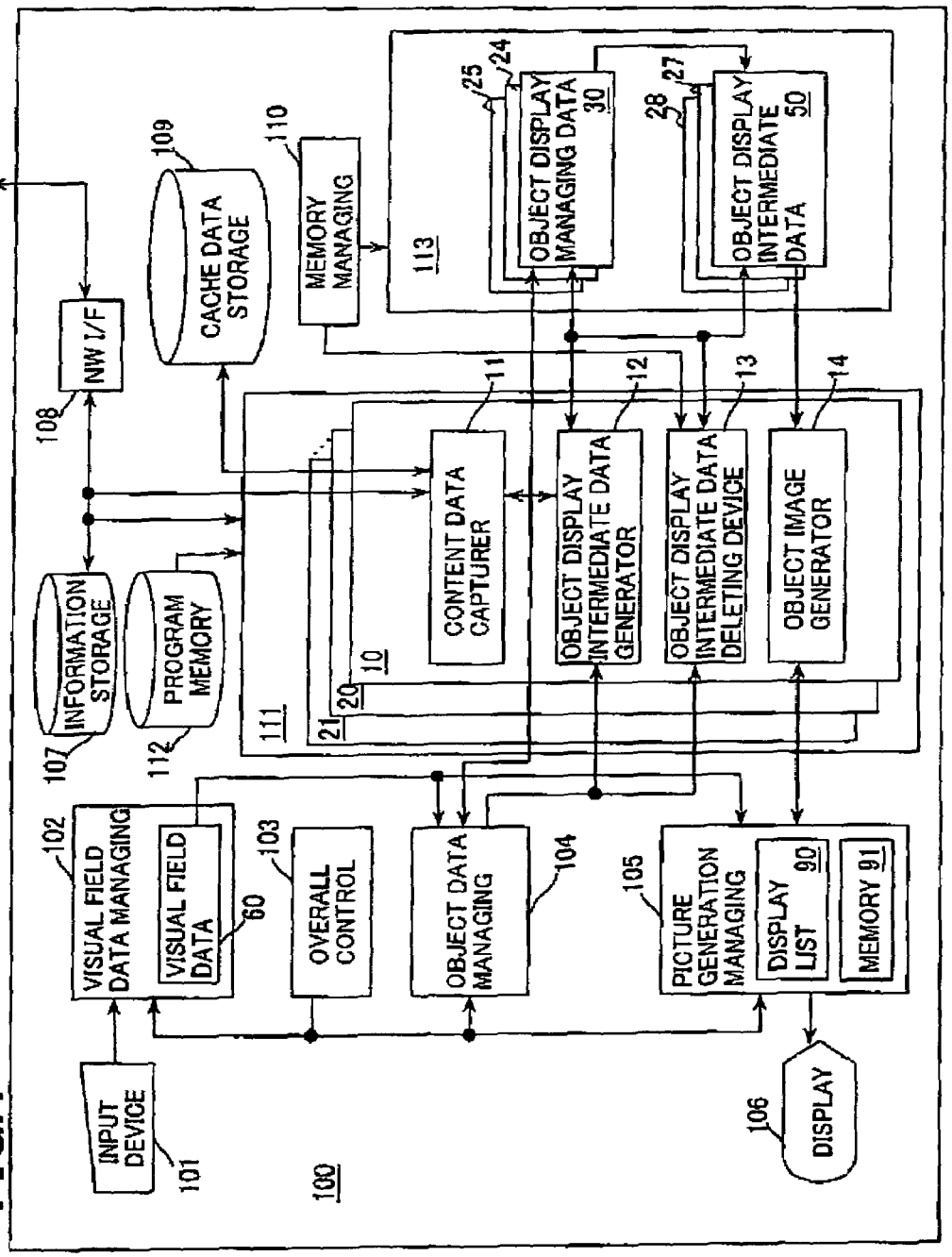
FIG. 1 shows an arrangement of an information processing apparatus according to an embodiment of the present invention.

FIG. 1 shows an information processing apparatus 100 according to an embodiment of the invention. The information processing apparatus 100 includes an input device 101, visual field data managing means or manager 102, overall processing control means 103, object data managing means 104, display picture generation managing means 105, a display device 106, an information storage device 107, a network interface 108, a cache data storage device 109, memory managing means 110, an object data processor 111, a data processing program memory unit 112 and an object data memory unit 113.

The visual field data managing means 102, the overall processing control means 103, the display picture generation managing means 105 and the memory managing means 110 may be implemented in the form of a processor or processors having programs for the respective means, or may be a processor or processors including the functions of the respective means in the form of integrated circuits.

Figure 2:
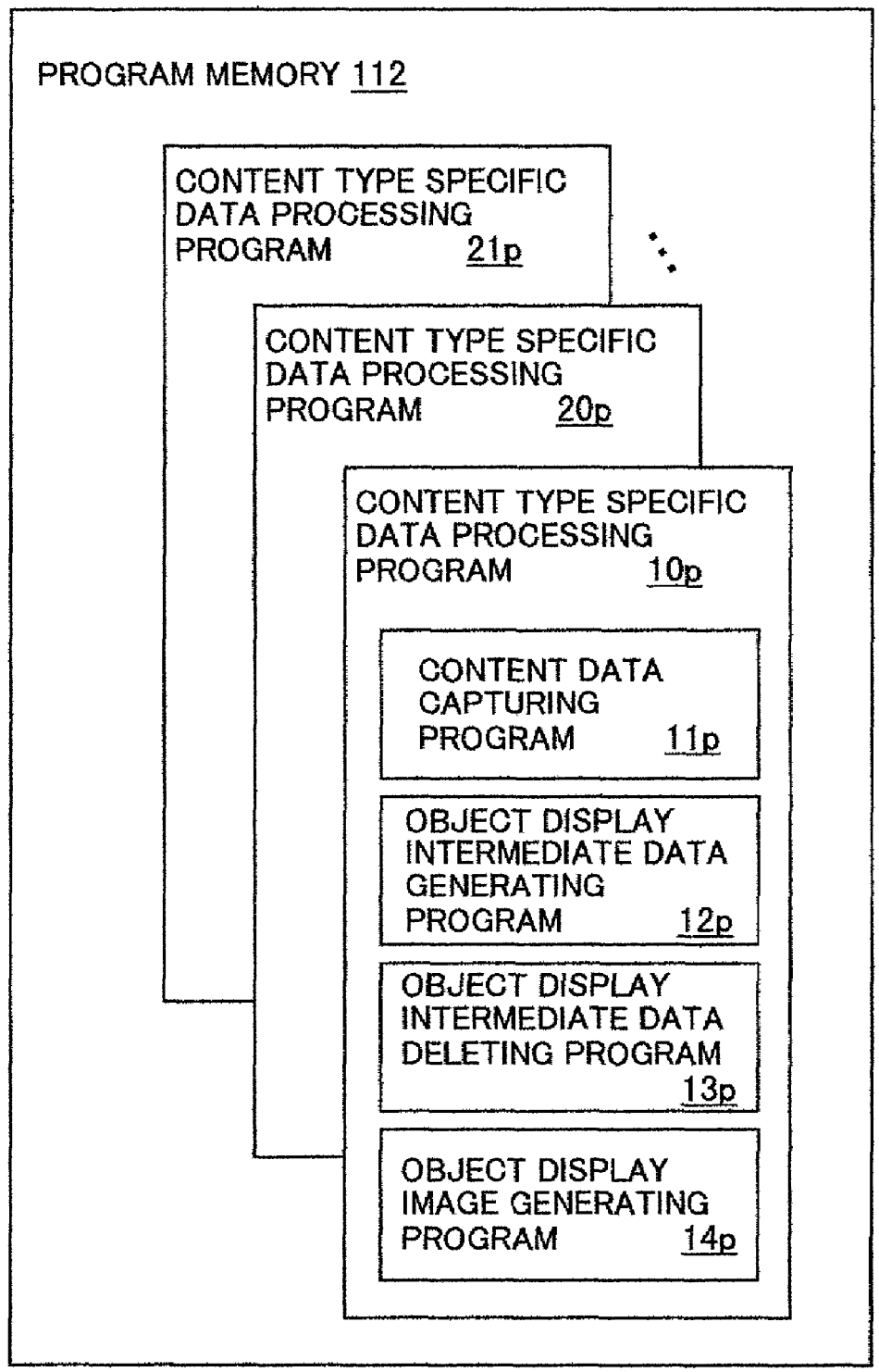
FIG. 2 shows content type specific data processing programs stored in a program storage section.

FIG. 2 shows content type specific data processing programs 10p, 20p, ..., 21p corresponding to a plurality of content type specific data processor functions 10, 20, ..., 21. The content type specific data processing programs 10p, 20p, ..., 21p are stored in the program memory unit 112 in such a manner that they can be executed by the object data processor 111. The programs lop, 20p, ..., 21p are executed in the object data processor 111 to provide the content type specific data processor functions 10, 20, ..., 21. The content type specific data processing programs 10p, 20p, ..., 21p are specific to types of contents to be displayed, and the number of the programs prepared is equal to the number of types of contents to be displayed.

The content type specific data processing program lop includes a content data capturing or taking-in program lip, an object displaying intermediate data generating program 12p, an object displaying intermediate data deleting program 13p, and an object display image generating program 14p. The other content type specific data processing programs 20p, ..., 21p have the same configuration as the program 10p.

Alternatively, the data processing programs 10p, 20p, ..., 21p may be held in a memory in the object data processor 111 in an executable manner, as in the program memory unit 112.

The object data memory unit 113 stores therein a plurality of object display managing data (i.e. managing data for displaying objects) 30, 24, 25, ..., and a plurality of object display intermediate data (i.e. intermediate data for displaying objects) 50, 27, 28, .... An object display managing data and an object display intermediate data are prepared for each of the information objects to be displayed.

The input device 101 generates operation input data relating to display picture visual field movement and the like in response to the operation of the device 101 by a user, and supplies the input data to the visual field data managing means 102. The visual field data managing means 102 holds visual field data 60 and renews or updates it in accordance with the data inputted by the user.

The overall processing control means 103 controls overall processing done in the information processing apparatus 100. including operations of the visual field data managing means 102, the object data managing means 104 and the display picture generation managing means 105. The overall processing control means 103 controls operations of various sections of the information processing apparatus 100 so that processing for display can be done in real time.

The object data managing means 104 generates, renews or deletes the object display managing data 30, 34, 25, ..., and the object display intermediate data 50, 27, 28, ..., using an object display intermediate data generator function 12 and an object display intermediate data deletion function 13 within the object type specific data processor function 10, in accordance with the visual field data 60.

The object data managing means 104 performs traversing or search of links between the information objects, starting from a representative or base object, and then performs processing for preparation for information object display, whereby the link traverse and display preparation for information objects involved in display image generation can be processed efficiently.

The object data managing means 104 determines for each information object, whether the object display intermediate data generation should be executed or not, based on the geometric relation between a visual field 71 and that information object. In accordance with the determination, the object data managing means 104 causes the object display intermediate data generator function 12 to execute the object display intermediate data generation, to thereby generate the object displaying intermediate data at an appropriate timing with change of the visual field 71.

The display picture generation managing means 105 manages a display list 90 and generates a display picture by rendering, on a frame memory 91, two-dimensional image data generated by the object display image generator function 14 in accordance with the visual field data 60 and the object display intermediate data 50.

The display device 106 displays a picture generated by the display picture generation managing means 105. The display picture generation managing means 105 determines, from the geometric relation between the visual field 71 and information objects, whether or not a particular information object should be displayed on the display screen, and causes the object display image generator function 14 to execute real-time rendering of that information object on the display frame screen if that information object is determined to be displayed. In this manner an information object to be displayed is properly selected for displaying in accordance with the shift of the visual field 71. The object display image generator function 14 can display information objects in different forms In accordance with display priority of the information objects and/or geometric relations between the visual field 71 and the information objects. This enables proper displaying of the information objects for the geometric relation between the visual field 71 and the information objects, whereby the amount of processing for low display priority information objects can be kept low, and the information objects can be displayed in variable form depending on the geometric relations between the visual field 71 and the information objects.

The information storage device 107 stores source content data. The device 107 includes, e.g. a hard disc, a CD, an MO, a DVD, a flash memory and the like.

The network interface 108 includes, e.g. a modem and a dialer and is used for connecting the information processing apparatus 100 for communication with an external network (not shown), e.g. the Internet. The network interface 108 is connected to the external network for communication therewith when, for example, a content data capturer or taking-in device function 11 captures or takes in source content data from the external network.

The cache data storage device 109 temporarily stores the content data captured by the content data capturer function 11 and other data to be used in display, for subsequent use in the information processing apparatus 100.

The memory managing means 110 monitors the amount of memory used to store the object display intermediate data 50 and the like and to reduce or delete data in the memory when, for example, the amount of used memory increases.

Figure 3:
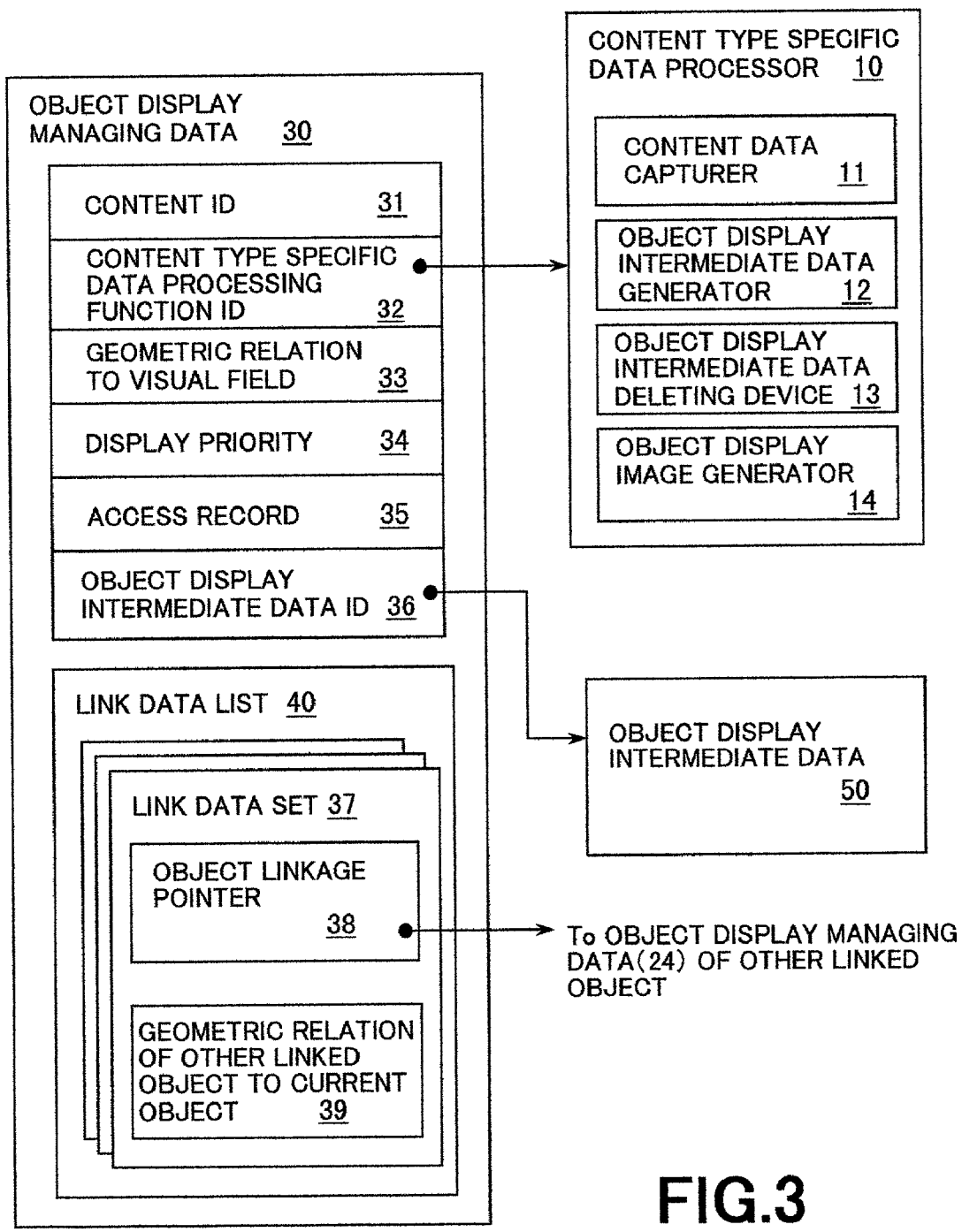
FIG. 3 shows the structure in detail of object display managing data for each information object shown in FIG. 1, and relation between the object display managing data, object display intermediate data associated with the object display managing data and a content type specific data processor function.

FIG. 3 shows the details of the structure of the object display managing data 30 for each information object, and also the relation of the object display managing data 30 with its corresponding object display intermediate data 50 and content type specific data processor function 10.

The object display managing data 30 for each information object includes a plurality of fields for content identification 31, content type specific data processing function identification 32, data 33 representing the geometric relation to the visual field, display priority 34, access record 35, object display intermediate data identification 36, and a link data list 40.

The content identification 31 is information, such as URL, file name, or directory, for identifying the content to be displayed.

The content type specific data processing function identification 32 is information for identifying the content type specific data processor function 10 for the data processing of the information object being managed by the object information managing data 30.

The geometric relation representative data 33 defines the geometric relation of an information object 73 to a virtual visual field coordinate system 72 established for displaying information objects disposed in a two-dimensional or three-dimensional virtual space. The geometric relation is a relative relation in position, orientation, scale ratio and the like.

Figure 13:
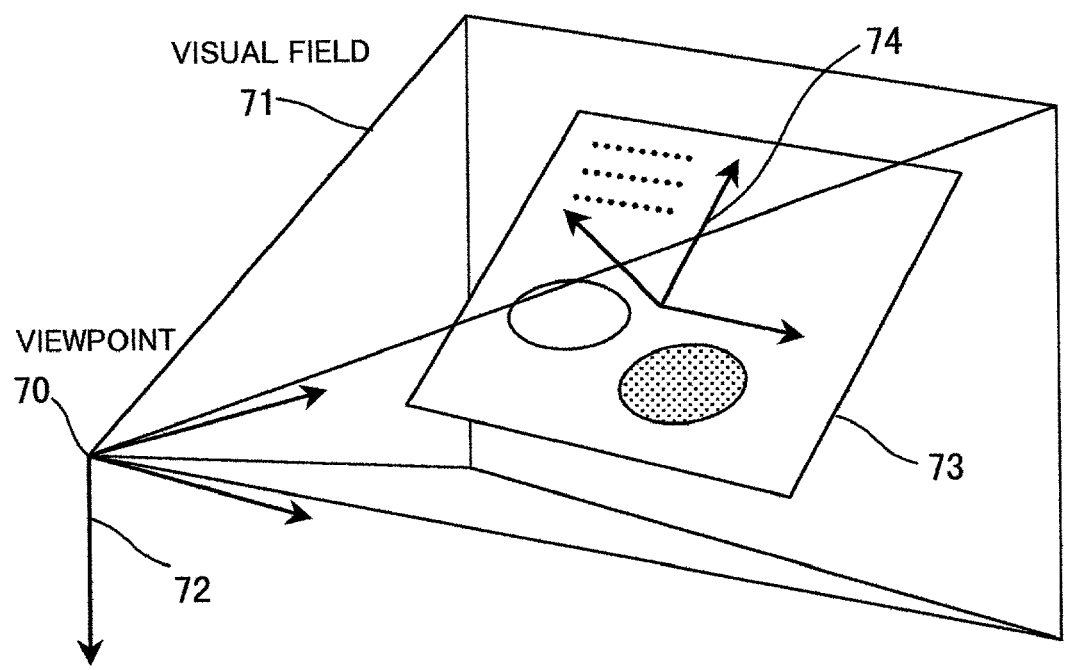
FIG. 13 illustrates geometric relation between a visual field and an information object.

FIG. 13 illustrates the geometric relation between the visual field 71 of a user and an information object. In FIG. 13, the visual field 71 is defined in a virtual three-dimensional space, in which an information object 73 is disposed. A visual field coordinate system 72 fixed to the visual field 71 and an information object local coordinate system 74 fixed on the information object 73 are defined. A view point 70 is defined at the origin of the visual field coordinate system 72. The geometric relation representative data 33 can be defined by, for example, transform matrix for transforming the information object local coordinate system 74 into the visual field coordinate system 72, or any other suitable means.

Referring back to FIG. 3, the display priority 34 is a variable for use in processing for information object display. The higher that priority, the more the information object display is desired. The value of the display priority is determined by calculation mainly based on the data 33 representing the geometric relation of the information object to the visual field. Each time the geometric relation representative data 33 changes, the value is calculated anew and renewed in general, an information object 73 in such a geometric relation as to be more easily seen has a higher priority value. The display priority 34 may be a single variable or separately prepared plural variables. As will be described later, the display priority is compared with a predetermined threshold value, for generation of object display intermediate data and display of an information object.

The access record 35 is a record of the time of the processing last made for displaying an information object. The access record 35 is mainly used as the basis on which it is determined whether the object display intermediate data 50 or the object display managing data 30 of information objects which have not been displayed for a long time should be deleted or reduced or not.

The object display intermediate data identification 36 identifies the object information display intermediate data 50 that is directly used in generating a display image of the information object being managed by the object display managing data 30. The identification 36 may be, for example, a pointer to the object display intermediate data 50 in the memory.

The link data list 40 is a list of information for links from one information object to other information objects, and includes a plurality of link data sets 37.

Each link data set 37 includes a field for a pointer to another object to be linked to (hereinafter referred to as object linkage pointer) 38 representing the linking of one information object to another, and a field for data 39 representing a geometric relation of another information object to be linked to (hereinafter referred to as other linked information object), which is an information object the current object is linked to, relative to a current object information. The object linkage pointer 38 can be a pointer to the object information managing data of the other linked object information, for example. The data 39 representing the geometric relation of the other linked information object relative to a current information object can be expressed by for example a coordinate transform matrix for transforming the local coordinate system of the other linked information object into the local coordinate system 74 of the current information object.

When a link is defined between two information objects, the link data list 40 in the object display managing data 30 of one information object contains the link data set 37 for the link to the other object and vice versa in principle. For example, in source data of HTML documents, in general, only a one-way link from a current document to another subsequent document (hereinafter also referred to as other linked document) is described. Even in such a case, when the link data set 37 for the link to the other linked document is prepared in the link data list 40 of the object display managing data 30 of the current document, another link data set 37 for the link with the current document is also prepared in the link data list 40 of the corresponding object display managing data 30 of the other linked document. This makes bidirectional link traverse possible. The link data set 37 may be arranged to distinguish between a previous object linked to the current object and a subsequent object linked from the current object, and may contain a description representing a link with the previous or parent object and a description representing a link to the other linked or child object.

The content type specific data processor functions 10, 20, . . . , 21 provide different data processing procedures for respective content types. Each content specific data processor function, e.g. 10, includes a content data capturer function 11, an object displaying intermediate data generator function 12, an object displaying intermediate data deleting device function 13, and an object display image generator function 14.

The content data capturer function 11 captures content data for displaying an information object, through the information storage device 107, the network interface 108 or the cache data storage device 109 of the information processing apparatus 100 when such content data is required for displaying the object, and supplies it to the object displaying intermediate data generator function 12. The content data capturer function 11, when it has captured content data, may store the content data in the cache data storage device 109 for later re-use.

The object displaying intermediate data generator function 12 generates and renews object displaying intermediate data 50 in accordance with content data captured through the content data capturer function 11. The object display intermediate data generation and renewal are executed under the control of the object data managing means 104, when the display priority 34 has a value higher than the predetermined threshold value as the data 33 representing the geometric relation of that information object to the visual field changes.

The object displaying intermediate data deleting device function 13 deletes all or part of object display intermediate data. The deletion is performed under the control of the object data managing means 104 and/or the memory managing means 110.

Under the control of the display picture generation managing means 105, the object display image generator function 14 generates in real time, in the display picture generating process, part of an object within a display picture that is smoothly changing as the visual field shifts smoothly, using the object display managing data 30 and the object displaying intermediate data 50.

The object displaying intermediate data generator function 12, the object displaying intermediate data deleting device function 13 and the object display image generator function 14 independently operate asynchronously with respect to each other, which may be done executing them in separate threads or processes.

The object display intermediate data 50 which Is being generated or renewed by the object displaying intermediate data generator function 12, and also the intermediate data 50, part or all of which has been deleted by the object displaying intermediate data deleting device function 13, can be looked into asynchronously at any desired time by the object display image generator function 14 and can be used in real time display Image generation. For that purpose, the object displaying intermediate data generator function 12 and the object displaying intermediate data deleting device function 13 generate and renew and delete the object display intermediate data 50, in such a manner and sequence as not to cause any contradiction when the object display image generator function 14 looks into the object display intermediate data 50 currently being processed and generates the Subject display image.

Asynchronous operation of the object displaying intermediate data generator function 12, the object displaying intermediate data deleting device function 13 and the object display image generator function 14 makes it possible to generate a display picture smoothly changing as the visual field smoothly shifts, using the object display intermediate data 50 currently available. Even when it takes a long time to capture content data and to generate and renew the object displaying intermediate data 50, these functions 12, 13 and 14 are not required to wait until these capture, generation and renewal are completed.

The content type specific data processor function 10 may be pre-held in the object data processor 111 or in the program memory unit 112 of the information processing apparatus 100. Alternatively, the program for the content type specific data processing function 10 may be captured through the information storage means 107 or the network interface 108 and then held in the object data processor 111 or in the program memory unit 112.

The object displaying intermediate data 50 is generated by the object displaying intermediate data generator function 12 from the content data captured by the content data capturer function 11 in the content type specific data processor function 10 for an information object being handled, and is used by the object display image generator function 14 to generate a display image.

The object displaying intermediate data 50 is processed in the corresponding one of the content type specific data processor functions 10 provided for respective content types. Accordingly, the data format of the object displaying intermediate data 50 can be defined for each content type. Since optimum formats can be defined individually for the respective content types, display can be provided efficiently, and, in addition, a new content type specific data processor function 10 can be added easily and corresponding information contents can be processed easily.

The object data processor 111 holds therein or in the program memory unit 112, one or more content type specific data processor functions 10, 20, . . . , 21, which have functions to capture in different types of content data and to generate, renew, delete and look into specific types of object displaying intermediate data. Accordingly, different types of contents can be displayed, and it becomes easy to add a function for displaying another type of contents.

Figure 4:
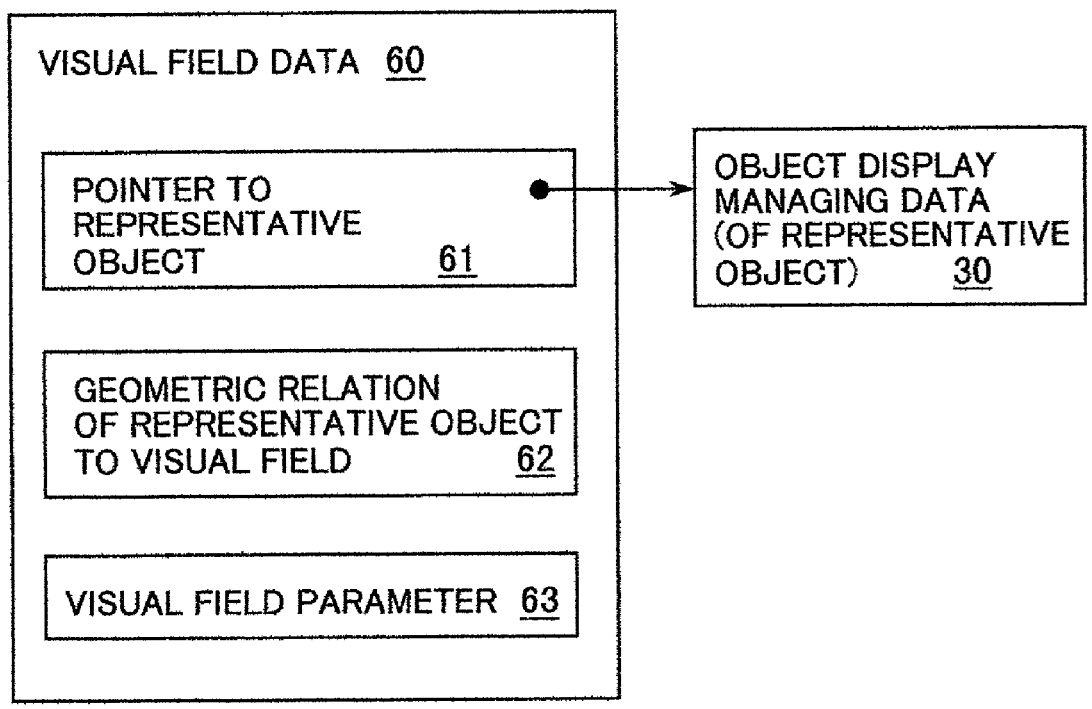
FIG. 4 illustrates an example of the structure of visual field data.

FIG. 4 shows the visual field data 60 in greater detail. The visual field data 60 contains fields for a representative object pointer 61, data 62 representing the geometric relation of a representative object to the visual field (hereinafter referred to as representative-object geometric relation data) and a visual field parameter 63. The representative object pointer 61 is data for identifying a representative or base object in information objects to be displayed, and may be arranged as a pointer to the object display managing data (30) of the representative object. The representative object is an information object from which the link traverse for the object display managing data 30 is started in linkage traverse shown in Step 204 in FIG. 6 as will be described later. The representative object may be an information object having the highest display priority 34.

The representative-object geometric relation data 62 defines the geometric relation of the representative object to a virtual visual field which is defined in order to display the information object 73 disposed in the two-dimensional or three-dimensional virtual space shown in FIG. 13.

The visual field parameter 63 defines a visual field angle or the like for generating an image, and is looked into, when a display picture is generated, by the object display image generator function 14 and the like controlled by the display picture generation managing means 105.

In the embodiment of the invention, a smooth change of the visual field 71 is realized by smoothly changing the representative-object geometric relation 62 relative to the visual field. The visual field data managing means 102 changes the representative-object geometric relation 62 relative to the visual field smoothly and continuously in accordance with the direction given through input data received from the input device 101 or a program.

The visual field data managing means 102 selects one of the information objects as a representative or base object, stores the selected representative object, defines the visual field by defining the geometric relation between the representative object and the visual field, and renews the visual field data when the representative object is changed without changing geometric relations of the respective information objects to the visual field. In this manner, the visual field can be defined simply by means of the relative geometric relation to a desired one of the information objects. Accordingly, there is no need for defining the absolute coordinate system, and, therefore, the reachable range is not limited by the scale for a particular coordinate system.

The display picture generation managing means 105 controls the object display image generator function 14 to generate in real time a display image in accordance with the visual field data 60, to thereby obtain a display picture smoothly changing with a smooth visual field change.

As the representative-object geometric relation 62 to the visual field changes, the geometric relations 33 of the respective information objects to the visual field also change, and the display priorities 34 change, which may cause the display priority 34 of some other information object to be higher than that of the representative object. If this happens, the information object having the higher display priority is selected as the representative object, and the representative object identification 61 in the visual field data 60 is rewritten. At the same time, the geometric relation to the visual field in the object display managing data 30 of the information object newly selected as the representative object is copied on the representative-object geometric relation data 62 in the visual field data 60, and stored. In this way, the representative object can be changed, while keeping the continuity of the visual field change. Thus, the linkage can be traversed infinitely in principle by shifting the visual field to display information objects without being limited by the scale ratio, by successively changing the representative object so that an information object whose geometric relation to the visual field can be defined with a standard scale is selected to be the representative abject.

Figure 5:
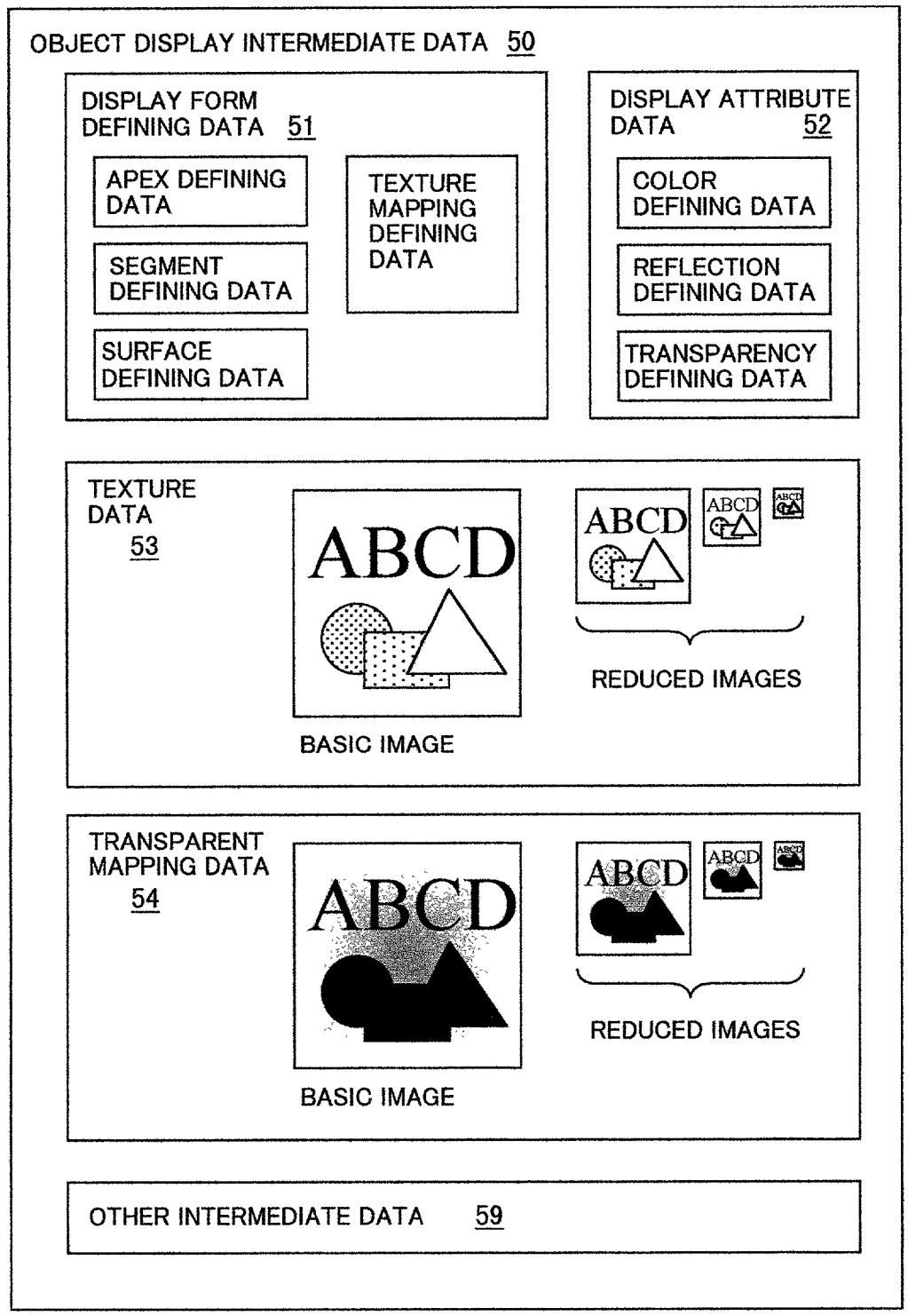
FIG. 5 illustrates an example of the structure of object display intermediate data.

FIG. 5 shows an example of the object display intermediate data. The object display intermediate data 50 includes display form defining data 51, display attribute data 52, texture data 53, transparent mapping data 54, and other intermediate data 59. The display form defining data 51 includes apex defining data, segment defining data, surface defining data and texture mapping defining data. The display attribute data 52 includes color defining data, reflection defining data and transparency defining data. The texture data 53 includes a basic image and a plurality of reduced basic images. The transparent mapping data 54 includes the basic image and a plurality of reduced basic images.

The object display image generator function 14 contained in the content type specific data processor function 10 for the content type of the information object uses such object display intermediate data 50 to generate in real time the object display image.

The object display intermediate data 50 may be of any form specific to the content type. The content type specific data processor function 10 and the data format of the object display intermediate data 50 are preset for each content type so that the respective processing procedures in the content type specific data processor function 10 can process the object display intermediate data 50 of the corresponding content types.

Figure 6:
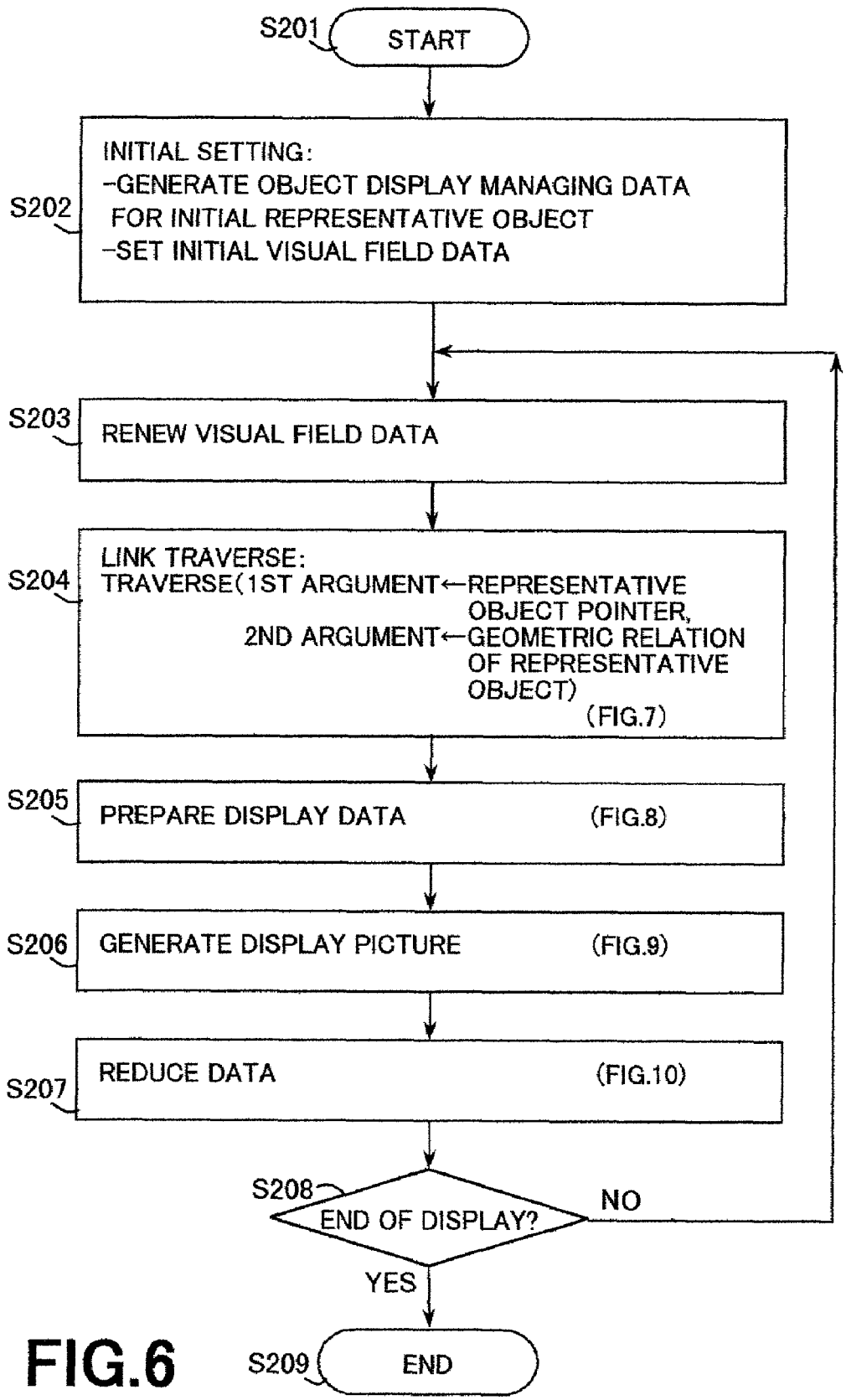
FIG. 6 is a general flow chart of information display processing according to the embodiment of the invention.

FIG. 6 is a flow chart of the general information display processing. The processing starts at Step 201. At Step 202, the control means 103 of the information processing apparatus 100 causes the object data managing means 104 to prepare the object display managing data 30 of an initial representative information object and, at the same time, causes the visual field data managing means 102 to set an initial value for the visual field data 60.

At Step 203, the control means 103 causes the visual field data managing means 102 to renew the visual field data. The visual field data managing means 102 computes the visual field coordinate system 72 so as to smoothly vary the visual field 71 in accordance with the input data from, for example, the input device 101, and renews the visual field data 60. When it is necessary to change the representative object, the control means 103 performs processing involved in the change of the representative object through the object data managing means 104 as described above.

Figure 7:
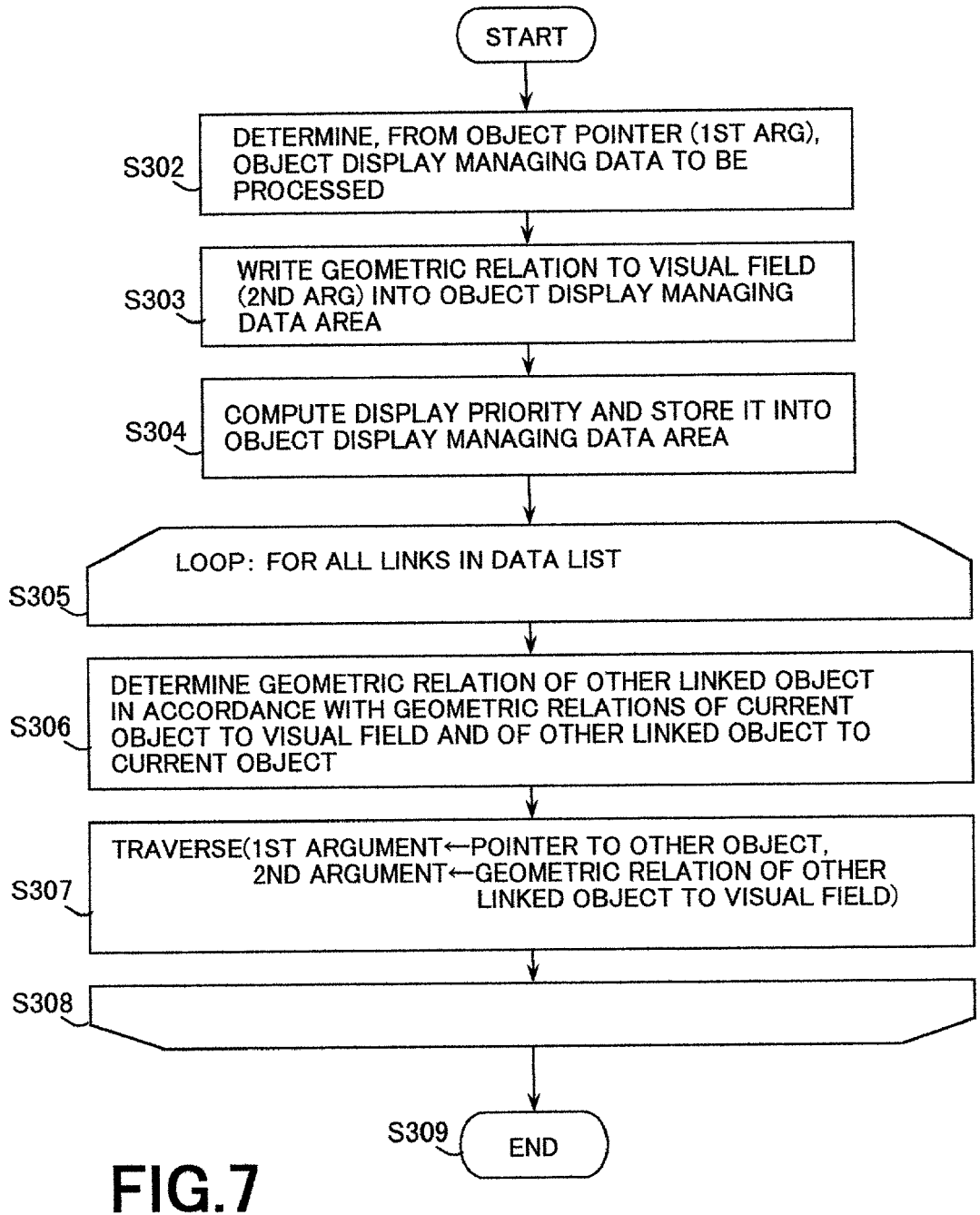
FIG. 7 is a flow chart of traversing links.

At Step 204, the control means 103 causes the object data managing means 104 to perform the traverse of the links between information objects. In the linkage traverse, the object display intermediate data generator functions 12 determine the data 33 representing the geometric relations of all of the object display managing data 30, 24, 25, ... within the object data memory unit 113, relative to the visual field, and determine the display priorities 34 based on the data 33. For that purpose, the object display intermediate data generator functions 12 call the linkage traverse processing. In this case, in the linkage traverse processing TRAVERSE, the representative object pointer 61 is set to the first argument, and the representative-object geometric relation data 62 is set to the second argument. FIG. 7 is a flow chart of the linkage traverse processing TRAVERSE.

Figure 8:
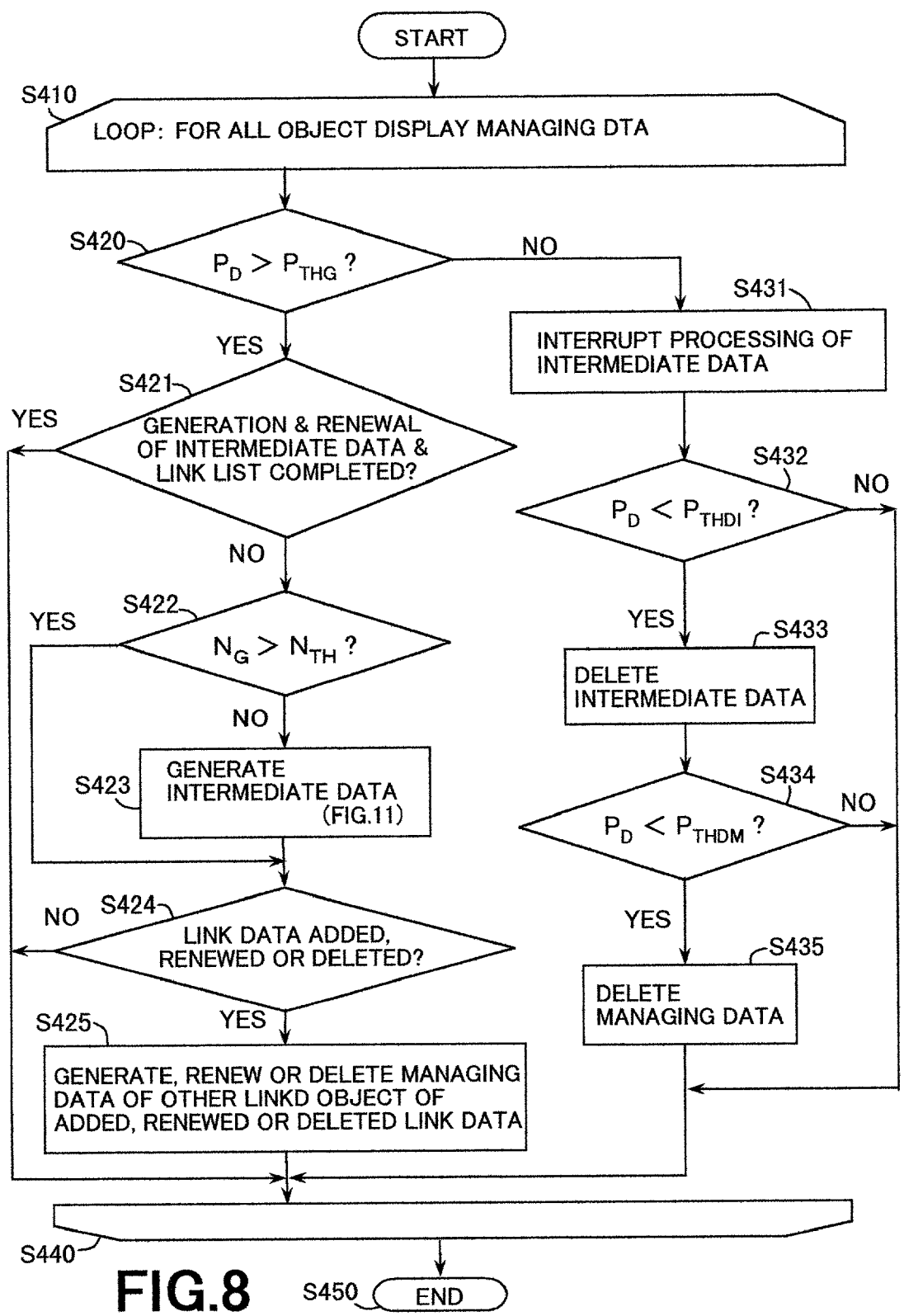
FIG. 8 is a flow chart of preparing display data.

At Step 205, the control means 103 causes the object data managing means 104 to prepare display data. In accordance with the display priorities 34 of the respective information objects, the object data managing means 104 causes the object display intermediate data generator functions 12 and the object display intermediate data deleting device functions 13 of the type specific data processor functions 10 to generate, renew or delete the object display intermediate data 50, and also renews the link data list 40 in the object display managing data 30. FIG. 8 is an example of a flow chart of the display data preparation.

Figure 9:
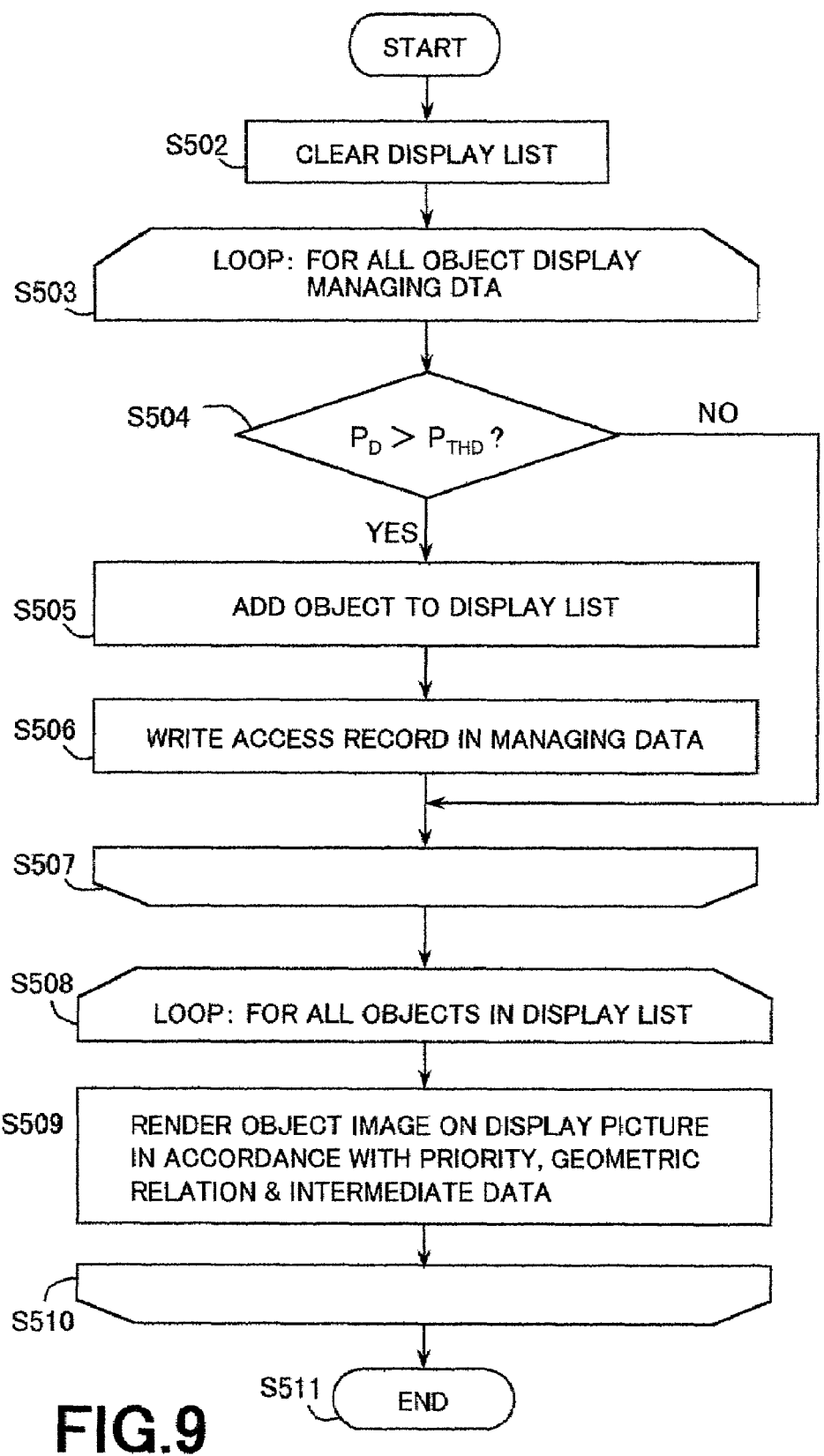
FIG. 9 is a flow chart of generating display a picture.

At Step 206, the control means 103 causes the object data managing means 104 to control the object display image generator functions 14 to generate a display picture. The object image display generator function 14 generates a display image in accordance with the data 33 representing the geometric relation of each information object to the visual field, the display priority 34 and the object display intermediate data 50. FIG. 9 is an example of flow chart of display picture generation.

Under the control of the control means 103, the display picture generation control means 105 renders the display images generated by the object display image generator function 14 on to the frame memory 91 for displaying on the display device 10.

Figure 10:
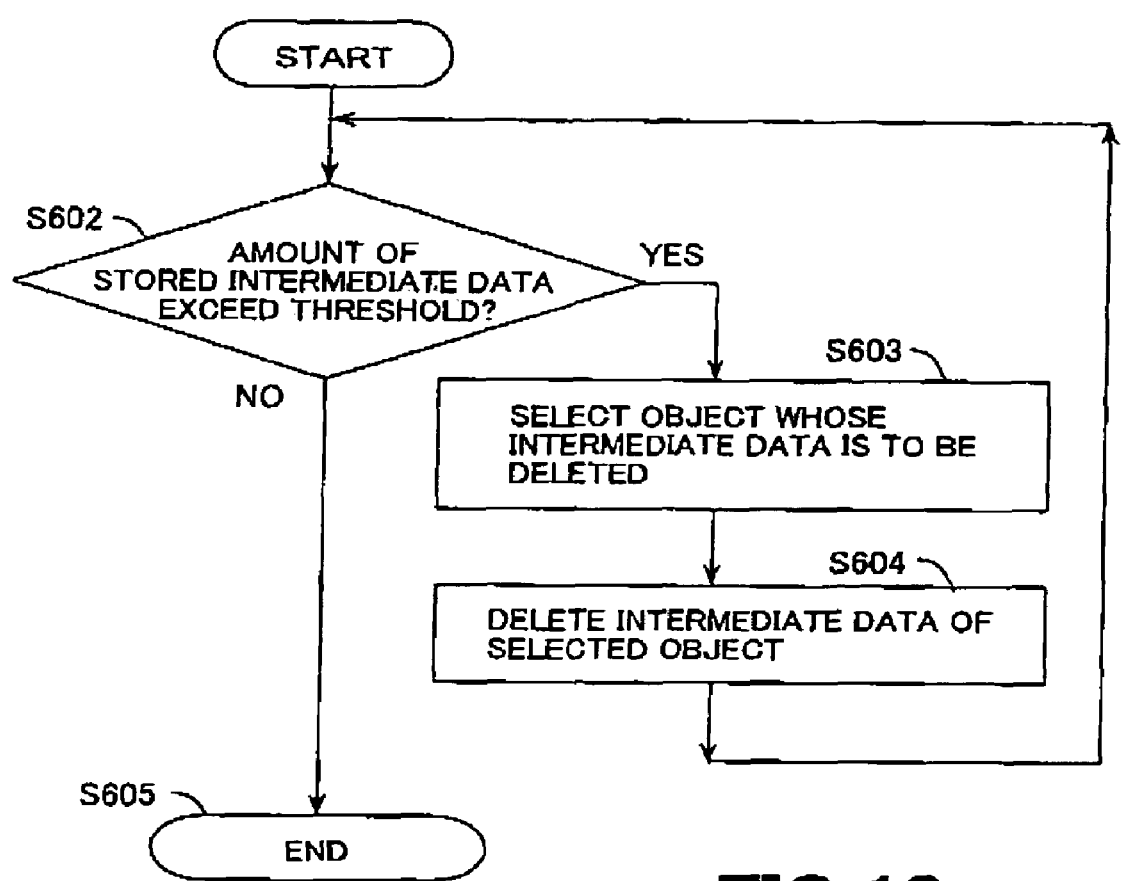
FIG. 10 is a flow chart of reducing data.

At Step 207, the information processing apparatus 100 causes, through the object data managing means 104, the object display Image deleting device function 13 to delete data when required. The object data managing means 104 reduces the data stored in the object data memory unit 113 when the amount of memory of the unit 113 occupied exceeds the predetermined threshold value. FIG. 10 is an example of flow chart of the data reduction.

At Step 208, the control means 103 determines whether the information display should be ended or not. If it determines that the information display should be continued, the processing returns to the Step 203. To end the information display, the procedure advances to Step 209.

FIG. 7 is a flow chart of the linkage TRAVERSE. As described previously, when the TRAVERSE with the representative object pointer 61 as the first argument and the representative-object geometric relation data 62 as the second argument is started, the object data managing means 104 executes the linkage traversing shown in FIG. 7.

In FIG. 7, the object data managing means 104 at Step 302 determines the object display managing data 30 to be processed based on the object pointer which is the first argument.

At Step 303, the object data managing means 104 stores the geometric relation data which is the second argument, as the data 33 representing the geometric relation to the visual field in the object display managing data 30 to be processed.

At Step 304, the object data managing means 104 computes the display priority from the geometric relation representative data 33 and stores it in the display priority field 34 in the object display managing data 30.

Steps between Steps 305 and 308 inclusive form a loop. The object data managing means 104 executes the respective steps in the loop for all of the link data sets 37 in the link data list 40 of the object display managing data 30 to be currently processed.

At Step 306 in the loop, the object data managing means 104 determines the geometric relation of another linked object, to which the current object is to be linked, to the visual field, on the basis of the data 33 representing the geometric relation of the current object to be processed to the visual field and the data representing the geometric relation 39 of the other linked object to the current object to be processed.

At Step 307, the object data managing means 104 sets the object linkage pointer 38 to the first argument and sets, to the second argument, the data representing the geometric relation of the other linked object relative to the visual field as determined at Step 306, and iteratively calls and executes the processing TRAVERSE. In the TRAVERSE processing, processing is done as at Steps 302-304.

At Step 308, the processing in the loop is continued until the processing of all of the link data sets 37 is completed. When the processing loop from Step 305 to Step 308 is completed, the procedure advances to Step 309, where the linkage traverse is ended.

FIG. 8 is a flow chart of the display data preparation. As described previously, when the display data preparation is started at Step 205 of FIG. 6, the object data managing means 104 executes the display data preparation shown in FIG. 8.

Steps between Step 410 and Step 440 inclusive form a loop, and the object data managing means 104 executes the respective steps in the loop for all of the object display managing data 30, 24, 25, . . . , stored in the object data memory unit 113.

At Step 420 in the loop shown in FIG. 8, the object data managing means 104 determines whether the display priority $P_D$ of one object display managing data 30 is higher than a predetermined threshold value $P_{THG}$ which is the condition for starting the generation of the object display intermediate data 50. If the priority $P_D$ 34 is determined to be higher than the threshold $P_{THG}$, the procedure advances to Step 421. On the other hand, if the priority $P_D$ 34 is determined not to be higher than the threshold $P_{THG}$, the procedure advances to Step 431.

At Step 421, the object data managing means 104 determines, with respect to the object display managing data 30, whether the generation and renewal of the object display intermediate data 50 and the link data list 40 have been completed. If they are determined to have been completed, the procedure advances to Step 440. If they are determined not to have been finished, the procedure advances to Step 422.

At Step 422, the object data managing means 104 determines whether the number $N_G$ of other information objects (or object display managing data) of which a display priority $P_D$ is higher than the display priority $P_D$ 34 and of which object display intermediate data is being generated or being renewed, is larger than a predetermined threshold value $N_{TH}$. If the number $N_G$ is determined to be larger than the threshold $N_{TH}$, the procedure advances to Step 424. If the number $N_G$ is determined not to be larger than the threshold $N_{TH}$, the procedure advances to Step 423.

Figure 11:
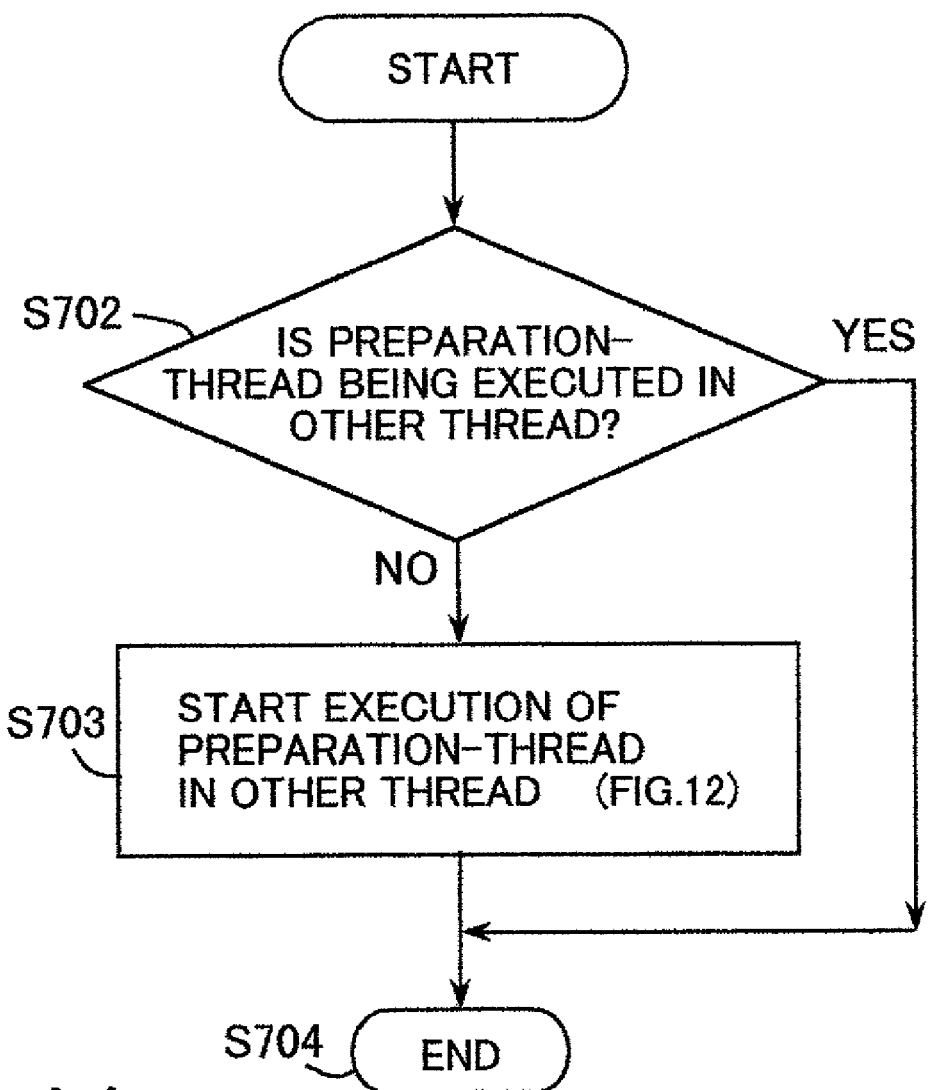
FIG. 11 is a flow chart of generating object display intermediate data.

At Step 423, the object data managing means 104 calls a processing PREPARE for generating object display intermediate data shown in FIG. 11. In the intermediate data generation PREPARE, the object data managing means 104 activates another thread and, in this thread, generates and renews data in the fields of the object display intermediate data 50 and the link data list 40.

At Step 424, the object data managing means 104 determines, with respect to the link data list 40, whether or not the addition, renewal or deletion of the link data set 37 has been done. If such addition, renewal or deletion is determined to have been done, the procedure advances to Step 425. If such addition, renewal or deletion is determined not to have been done, the procedure advances to Step 440.

At Step 425, in relation to the added, renewed or deleted link data set 37, the object data managing means 104 generates, renews or deletes object managing data for the other linked object. Thereafter, the procedure advances to Step 440.

At Step 431 branching from Step 420, if the object display intermediate data is being generated or renewed, the object data managing means 104 interrupts the generating or renewing processing.

At Step 432, the object data managing means 104 determines whether the display priority $P_D$ 34 is lower than the threshold value $P_{THDI}$, which is the condition for deleting the object display intermediate data 50. If the priority $P_D$ 34 is determined to be lower than the threshold $P_{THDI}$, the procedure advances to Step 433. If the priority $P_D$ 34 is determined not to be lower than the threshold $P_{THDI}$, the procedure advances to Step 440. At Step 433, the object data managing means 104 causes the object display intermediate data deleting device function 13 to delete the object display intermediate data 50. If it is estimated that the deletion will not be completed in a short time, the deletion is done in a different thread.

At Step 434, the object data managing means 104 determines whether or not the display priority $P_D$ 34 is lower than a threshold value $P_{THDM}$, which is defined as the condition for deleting the object display managing data 30. If the display priority $P_D$ 34 is determined to be lower than the threshold $P_{THDM}$, the procedure advances to Step 435. If the display priority $P_D$ 34 is determined not to be lower than the threshold $P_{THDM}$, the procedure advances to Step 440. At Step 435, the object data managing means 104 deletes the object display managing data. After that, the procedure advances to Step 440.

At Step 440, the processing in the loop is continued until the display data preparation is completed for all of the object display managing data. When the processing in the loop between Step 410 and Step 440 inclusive is completed, the procedure advances to Step 450, and the display data preparation is completed.

FIG. 9 is a flow chart of the display picture generation. As described previously, when the display picture generation is started at Step 206 shown in FIG. 6, the display picture generation managing means 105 causes the object display image generator function 14 to execute the display picture generation illustrated in FIG. 9. At Step 502, the display picture generation managing means 105 clears the display list 90.

Step 503, Step 507 and the steps between them form a loop. The display picture generation managing means 105 executes successively the steps in the loop for all the object display managing data 30, 24, 25, . . . , stored in the object data memory unit 113.

At Step 504 in the loop, the display picture generation managing means 105 determines, for one set of object display managing data, e.g. data 30, whether the display priority $P_D$ 34 is higher than the threshold value $P_{THD}$, which is set as the condition of displaying an object. If the display priority $P_D$ is determined to be higher than the threshold $P_{THD}$, the procedure advances to Step 505. If the display priority $P_D$ is determined not to be higher than the threshold $P_{THD}$, the procedure advances to Step 507.

At Step 505, information identifying the object or, in fact, the display managing data 30 of that object, e.g. a pointer to the object display managing data 30, is added to the display list 90. It should be noted, however, that for display devices 106 of some types, in order to obtain proper display images, a display image of the information object located deepest from the visual field 71 must be first generated, and, then, a display image of the second deepest one and so on toward the nearest one. In this case, the display list 90 for the deepest information object is first prepared and then the lists 90 for successively nearer ones.

At Step 506, the display picture generation managing means 105 or the object data managing means 104 records the current time and other information in a field of the access record 35 in the display managing data 30 of the subject information object.

At Step 507, the processing in the loop is continued until the preparation of the display lists for all the object managing data is completed. If the processing in the loop formed by the steps between Steps 503 and 507 inclusive is completed, the procedure advances to Step 508.

Steps between Step 508 and Step 510 inclusive form a loop. For all information objects in the display list 90, the display picture generation managing means 105 executes the steps in the loop. If the display picture generation is performed first for the information object located deepest from the visual field 71 toward the nearest one, the respective steps in the loop are executed for the information object farthest (deepest) from the visual field 70 successively to the nearest information object, using the display list 90 prepared by the execution of the steps in the loop formed by the steps between Steps 503 and 507 inclusive.

At Step S509 in the loop, the display picture generation managing means 105 causes the object display image generator function 14 corresponding to the content type of the object being handled to generate an object display image in accordance with the geometric relation representative data 33, the display priority 34 and the object display intermediate data 50, and render the generated object display image on the display picture frame.

For one or more information objects, simultaneously (in parallel) with real time display picture generation under the control of the display picture generation managing means 105, the generations, renewals or deletions of a plurality of object display intermediate data are simultaneously executed under the control of the control means 103 or the object data managing means 104. This allows the object display intermediate data to be generated, renewed or deleted without interrupting real-time display image generation, even when there are information objects which require a long time for generation, renewal or deletion of their object display intermediate data. Simultaneous generation and renewal of the object display intermediate data for a plurality of objects can reduce the time required before the respective information objects are displayed.

The object display Image generator function 14 may generate a display image in varying forms in accordance with varying geometric relation representative data 33 or with varying values of the display priority $P_D$ 34. For example, the transparency of the information object may vary depending on the display priority $P_D$ 34. For example, an information object of lower display priority $P_D$ 34 may be displayed with a higher transparency. In this case, as the visual field 71 becomes nearer to a remote information object, the display priority 34 of that object increases, so that the transparent information object gradually becomes more visible. In the object display intermediate data 50 having the format shown in FIG. 5 for example, increase in processing time in display image generation can be avoided by employing an image with the minimum required resolution out of the basic or reduced images in the texture data 53 or transparent mapping data 54 in accordance with the data 33 representing the geometric relation of an information object to the visual field 71.

At Step 510, the execution of the steps in the loop formed by Steps 508-510 is repeated until the rendering for all of the information objects in the display list 90 is completed at Step S510. When the execution of the steps in the loop is completed, the procedure advances to Step 511, and the display picture generation is ended.

FIG. 10 is a flow chart of data reduction. When data reduction is started at Step 207 of FIG. 6 as described previously, the object data managing means 104 executes the data reduction shown in FIG. 10.

At Step 602, the object data managing means 104 determines whether the amount of memory occupied by the object display intermediate data 50 exceeds a predetermined threshold value. If the amount of memory occupied is determined to have exceeded the predetermined threshold, the procedure advances to Step 603. If the amount occupied is determined not to have exceeded the threshold, the procedure advances to Step 605, and the data reduction is finished.

At Step 603, the object data managing means 104 selects one of information objects whose object display intermediate data 50 is to be deleted, based on the display priority 34 of that information object and the access record 35. For example, an information object whose last use in generating a display image recorded in the access record 35 is oldest maybe selected. Alternatively, the object having the lowest display priority 34 may be selected. As a further alternative, the selection of object may be determined based on both of the display priority 34 and the access record 35. By releasing part of the memory region used in this manner, increase of the amount of memory occupied during a time period of the display processing can be avoided so as to keep the amount of memory occupied less than the predetermined value.

At Step 604, the object data managing means 104 causes the object display intermediate data deleting device function 13 of the content type specific data processor function 10 corresponding to the information object selected at Step 603, to delete the object display intermediate data 50 of the information object selected at Step 603. In this case, the object data managing means 104 may delete all or part of the object display intermediate data 50 of the selected information object. Alternatively, items to be deleted may be determined differently depending on the value of the display priority 34 of information objects.

If part of the object display intermediate data 50 has been deleted, the object data managing means 104 may renew or delete the object display intermediate data identification 36 in the object display managing data 30, as occasion demands. If the object display intermediate data 50 has been completely deleted, the object data managing means 104 empties the object display intermediate data identification 36.

FIG. 11 is an example of flow chart for object display intermediate data generation. When the intermediate data generating processing PREPARE is called by the object data managing means 104 at Step 423 of FIG. 8 as described previously, the corresponding object display intermediate data generator function 12 executes the object display intermediate data generation shown in FIG. 11.

The generation of object display intermediate data for each information object is performed by means of the object display intermediate data generator function 12 corresponding to that information object. The content type specific data processor function 10 including that object display intermediate data generator function 12 is identified by the content type specific data processing function identification 32 of the object display managing data 30. In this manner, the object display intermediate data 50 is generated by means of processing procedures specific to the content type of each information object.

At Step 702 in FIG. 11, the object display intermediate data generator function 12 determines, for the information object to be processed in the intermediate data generation PREPARE, whether or not an intermediate data generating thread PREPARATION-THREAD is being executed in another thread. If the processing is not being executed, the procedure advances to Step 703. If the processing is determined to be being executed, the procedure advances to Step 704, and the intermediate data generation PREPARE is ended.

Figure 12:
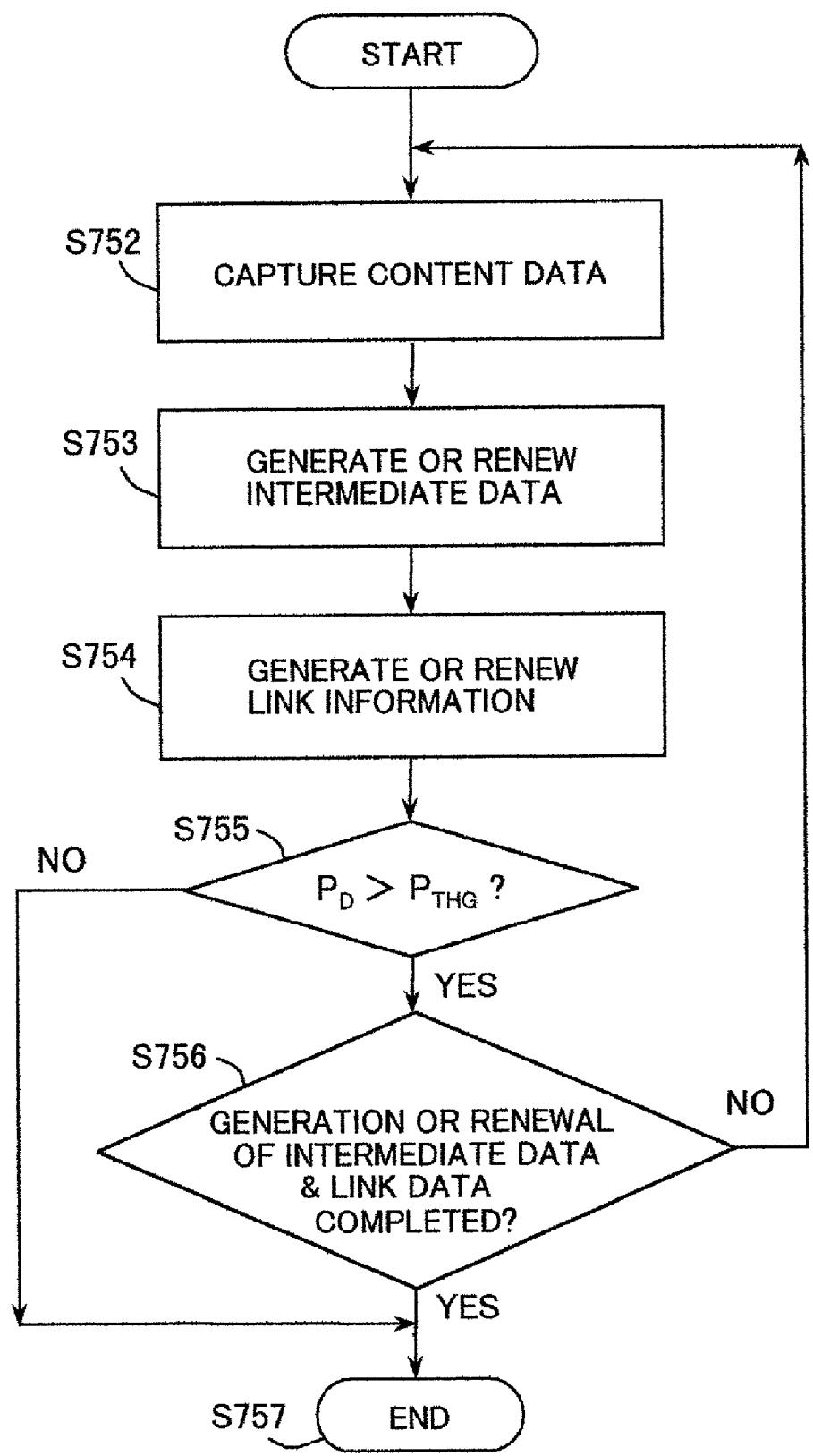
FIG. 12 exemplifies an intermediate data generating thread in the flow chart shown FIG. 11.

At Step 703, the object display intermediate data generator function 12 starts another thread to start the intermediate data generating thread PREPARATION-THREAD as exemplified in FIG. 12. The intermediate data generating processing PREPARE and the intermediate data generating thread PREPARATION-THREAD operate asynchronously.

At Step 703, the procedure advances to Step 704 to finish the intermediate data generating processing PREPARE without awaiting the end of the intermediate data generating thread PREPARATION-THREAD.

FIG. 12 exemplifies the intermediate data generating thread PREPARATION-THREAD different from the intermediate data generating processing PREPARE. At Step 752 in FIG. 12, the object display intermediate data generator function 12 requests the content data capturer function 11 to capture part or all of content data which is necessary for generation or renewal of the object display intermediate data 50 of a particular information object and which has not yet been captured. If, however, the capture of that data does not finish within a predetermined time, the data capture of Step 752 is interrupted, and the procedure advances to Step 753.

At Step 753, the object display intermediate data generator function 12 processes the content data which has been already captured, to generate or renew the object display intermediate data 50. If necessary, the object display intermediate data generator function 12 renews the object display intermediate data identification 36 of the object display managing data 30.

At Step 754, the object display intermediate data generator function 12 processes the content data which has been already captured and the object display intermediate data 50, and generate or renew the link data set 37 in the link data list 40 of the object display managing data 30 for that information object.

At Step 755, the object data managing means 104 determines whether the display priority $P_D$ 34 of a particular object display managing data 30 is higher than the threshold value $P_{THG}$, the condition for starting the generation of the object display intermediate data 50. If the display priority $P_D$ 34 is determined to be higher than the threshold $P_{THG}$, the procedure advances to Step 756. If the display priority $P_D$ 34 is determined not to be higher than the threshold $P_{THG}$, the procedure advances to Step 757 to interrupt the generation of the object display intermediate data 50 in the intermediate data generating thread PREPARATION-THREAD, and this thread is finished.

At Step 756, the object data managing means 104 determines whether the generation and renewal of the object display intermediate data 50 and link data list 40 for that object display managing data 30 have been completed or not. If the generation and renewal are determined to have been completed, the procedure advances to Step 757, to interrupt the generation of the object display intermediate data 50 in the intermediate data generating thread PREPARATION-THREAD, and this thread is finished. If the generation and renewal of the object display intermediate data 50 and link data list 40 are determined not to have been completed, the procedure returns to Step 752, and the processing is continued.

Figure 14:
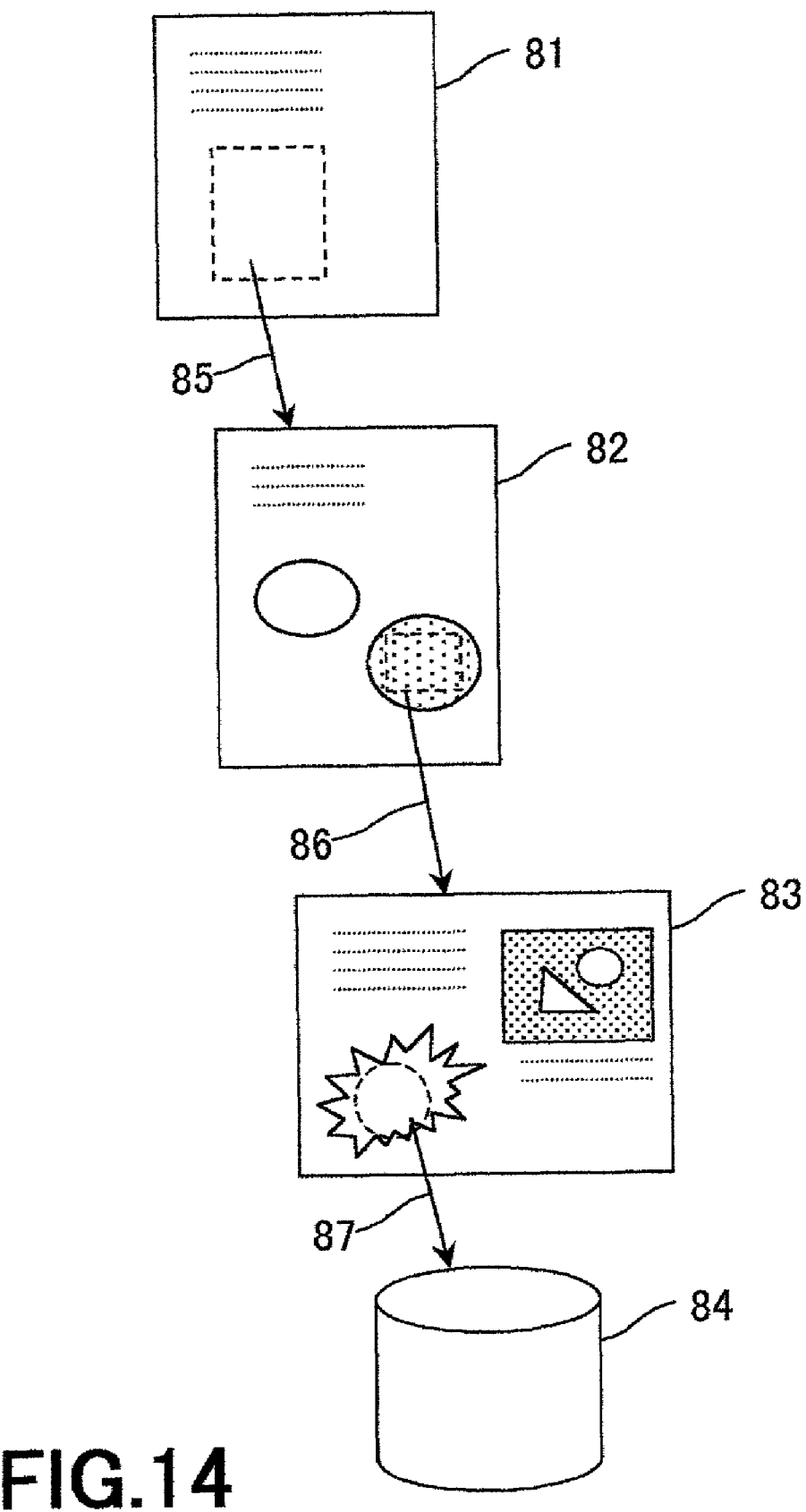
FIG. 14 illustrates an example of a linkage structure of information objects as displayed according to the embodiment of the invention.

FIG. 14 shows an example of linkage between information objects displayed according to the embodiment A link 85 to an information object 82 is defined in an information object 81. A link 86 to an information object 83 is defined in the information object 82. A link 87 to an information object 84 is defined in the information object 83. The content data of these information objects 81-84 may be of any one of forms, such as a plain text, a text file, e.g. an HTML document or an XML document, a data file , e.g. a JPEG or MPEG data file, a data stream, directory data, and program codes. The links 85-87 are ones defined by hyperlink data defined in the HTML or XML document, link data defined in the directory data, and other forms defined for other content types.

The number of links from one information object is zero (0) or one (1) in FIG. 14, but links from one information object to a plurality of information objects may be defined. The linkage may be a loop in which tracing along links starting from any one information object returns to the starting information object.

Actually, for a group of information objects having linkage like the one as shown in FIG. 14, the link data set 37 in the link data list 40 of the object display managing data 30 is described to be bidirectional in principle. Specifically, in the link data list 40 of the object display managing data 30 of the information object 81, the link data set 37 defining the link to the information object 82 is described. In the link data list 40 of the object display managing data 30 of the information object 82, the link data set 37 defining the links to the information objects 81 and 83 is described. In the link data list 40 of the object display managing data 30 of the information object 83, the link data set 37 defining the links to the information objects 82 and 84 is described. In the link data list 40 of the object display managing data 30 of the information object 84, the link data set 37 defining the link to the information object 83 is described.

FIGS. 15A through 15H show an example of display screens 901-908 on which display pictures are generated by continuously shifting the viewing point 70 and the visual field 71 shown in FIG. 13 with respect to the information objects 81, 82, 83 and 84 successively linked by the links 85, 86 and 87 shown in FIG. 14.

Figure 15A:
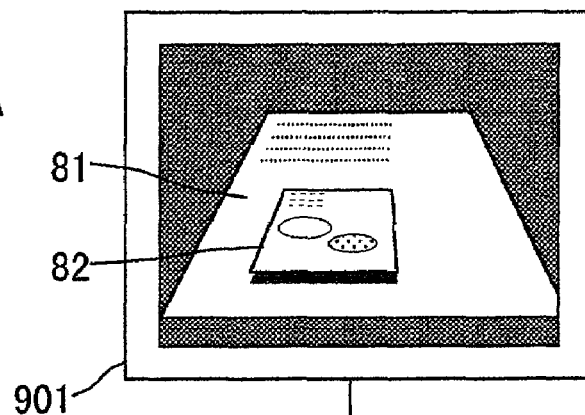
FIGS. 15A-15H illustrate an example of display screens when display pictures are generated by continuously changing the viewpoint and visual field shown in FIG. 13 with respect to the information objects with the links shown in FIG. 14.

FIG. 15A shows the display screen 901 of the information object 82 linked with the information object 81, being superposed on the information object 81 in a three-dimensional virtual space.

Figure 15B:
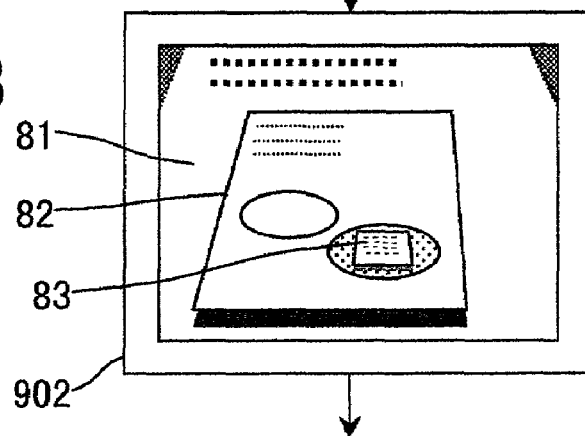

FIG. 15B shows the display screen 902 of a picture produced by bringing the view point 70 closer to the information objets 81 and 82 than that of the screen 901. Due to the shifting of the visual field 71, the information objects 81 and 82 are displayed larger than on the screen 901. Also, the information object 83 linked from the information object 82 is displayed above and in front of the information object 82. The information object 83 appears on the screen 902, because, as the geometric relation to the visual field 71 changes, the display priority $P_D$ 34 of the information object 83 increases above the threshold $P_{THG}$ which is the condition for starting the object display intermediate data generation, thereby the object display intermediate data 50 is generated, and the display priority $P_D$ 34 is higher than the threshold $P_{THD}$ which is the condition for the object display.

Figure 15C:
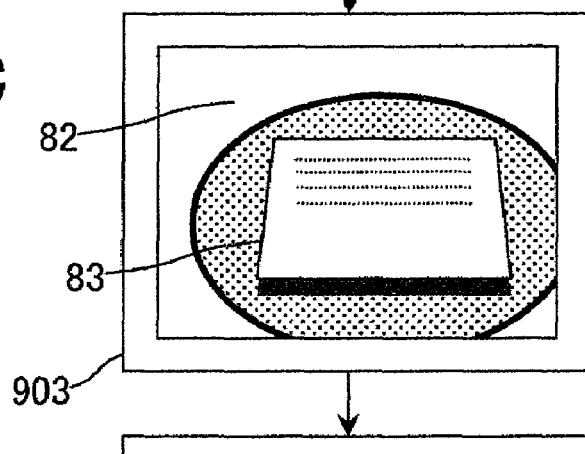

FIG. 15C shows the display screen 903 of a picture produced by bringing the view point 71 closer to the information objects 82 and 83 than that of the screen 902. As the visual field 71 moves, the information objects 82 and 83 are displayed larger than on the screen 902. In this picture, it is seen that the generation of the object display information data 50 for the information object 83 has not been completed yet, and the display image is generated from the object display intermediate data 50 in the middle of its generation.

Figure 15D:
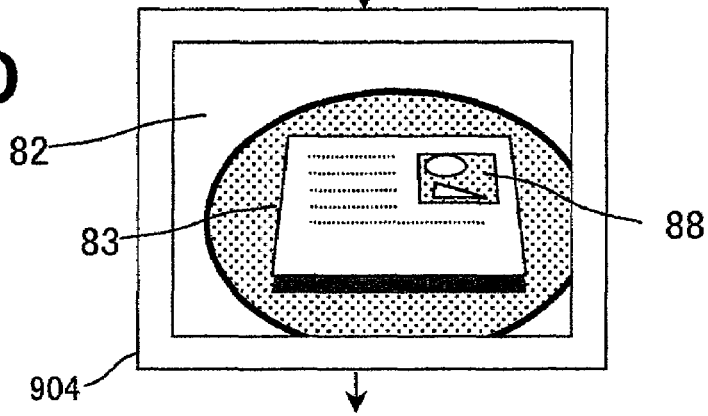

FIG. 15D shows the display screen 904 of a picture produced some time after the screen 903, without moving the view point 70 or visual field 71. The object display intermediate data 50 for the information object 83 has been further renewed than the screen 903, so that displayed images have been added. The information object 83 contains a moving image 88.

Figure 15E:
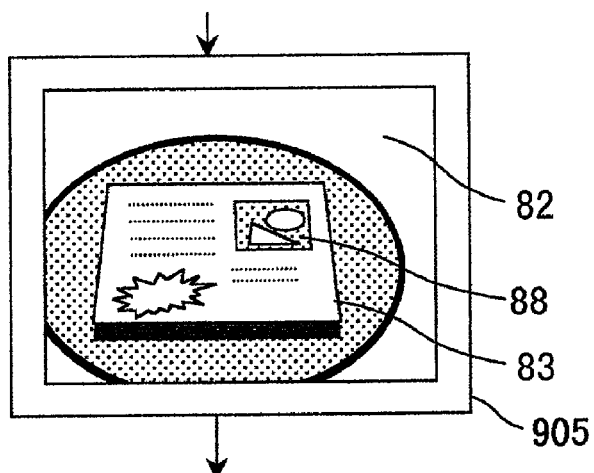

FIG. 15E shows the display screen 905 of a picture produced some time after the screen 904, by moving the visual field 71 slightly rightward. The object display intermediate data 50 for the information object 83 has been further renewed, resulting in addition of images and change of the display image. The moving image 88 changes as time goes by.

Figure 15F:
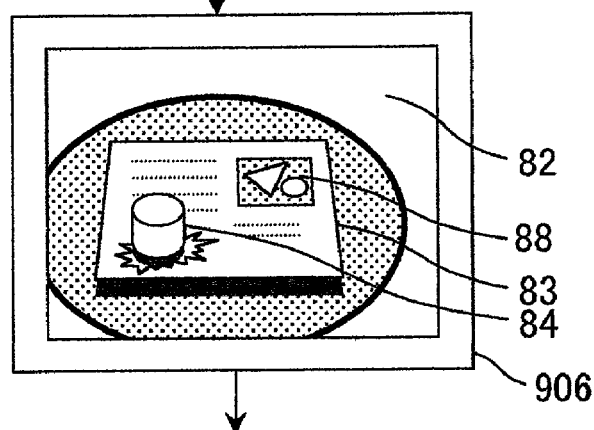

FIG. 15F shows the display screen 906 of a picture produced some time after the screen 905, with the view point 70 and visual field 71 unchanged. The moving image 88 in the object display intermediate data 50 of the information object 83 has been further renewed and, accordingly, changed. In addition, the information object 84 linked from the information object 83 appears on the screen 906. The information object 84 has appeared, because, as the geometric relation 33 to the visual field 71 changes, the display priority $P_D$ 34 for the information object 84 exceeds the threshold $P_{THG}$, the condition for starting the generation of the object display intermediate data 50, which causes the object display intermediate data 50 to be generated, and the display priority $P_D$ 34 is also higher than the threshold $P_{THD}$, which is the condition for the object display.

Figure 15G:
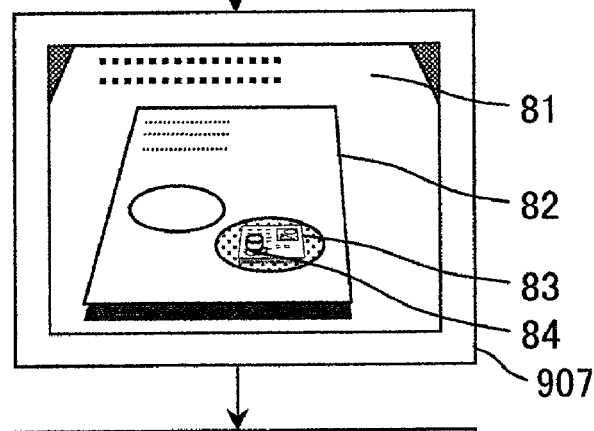

FIG. 15G shows the display screen 907 of a picture produced by pulling back the view point 70 from the position for the picture on the screen 906. In this picture, the information objects 82, 83 and 84 are displayed smaller, and the information object 81 which has been hidden by the information object 82 appears again.

Figure 15H:
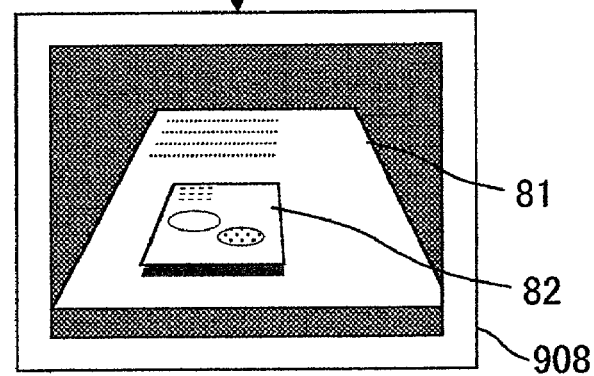

FIG. 15H shows the display screen 908 of a picture resulting from further pulling back the view point 70 from the position for the picture on the screen 907. The information objects 83 and 84, which were displayed on the screen 907, are no longer being displayed on the screen 908, because their display priorities 34 have become lower than the threshold $P_{THD}$, the condition for displaying objects, and hence they have been deleted from the display list 90.

For the picture on the screen 901, the information object 81 is selected as the representative object. On the screen 902, the information object 82 is selected as the representative object. For the pictures of the screens 903-906, the information object 83 is selected as the representative object. For the picture on the screen 908, the information object 81 is selected again as the representative object. In the illustrated example, it is somewhat difficult for the user to judge which one of the information objects is the representative object, but the picture may indicate, in a perceptible manner, which one of the information objects is the representative object.

At Steps 420, 422, 432, 504 and 755 of the above-described embodiment, whether or not the object display intermediate data should be generated, renewed or deleted, and whether or not the object display managing data should be deleted, and whether or not the object should be displayed are determined by comparing the display priority $P_D$ 34 with the reference thresholds for the respective conditions. However, they may be determined in other suitable ways as occasion demands.

The invention has been described by means of an embodiment which mainly deals with displaying visual information objects on a display screen. However, an audio signal generating function may be implemented as one of the functions of the object display image generator 14, with audio output means added to the apparatus, to thereby enable audio information objects to be produced.

The above-described embodiment is only a typical example, and its modifications and variations are apparent to people skilled in the art. It should be noted that people skilled in the art can make various modifications to the above-described embodiment without departing from the principle of the invention and the accompanying claims.

Advantages of the Invention

According to the invention, in displaying linked information objects in an information processing apparatus, advantageously, means is provided for enabling easier attainment of a desired one of the linked information objects by traversing the links between the information objects, smoother image change with shift of a visual field can be realized, and time required for a desired content to be displayed can be reduced. According to the invention, advantageously, the different types of contents can be displayed, displaying different types of contents can be realized by integrating means, and displaying additional types of contents is also facilitated.

What is claimed is:

1. An information processing apparatus for displaying an information object in a virtual space according to visual field data, where the information object represents one or more respective linked content items of different content types, and where said visual field data defines a visual field in said virtual space, said apparatus comprising:

holding means for holding, in an executable manner, a plurality of intermediate data generating means specific to said respective linked content items of different content types of the information object for generating respective pieces of intermediate data specific to a content type of a particular linked content item of the information object, said generated piece of intermediate data comprising at least either of texture data or display form defining data, and for holding, in an executable manner, a plurality of different display image generating means specific to said respective linked content items of different content types of the information object for generating respective display images from said respective generated pieces of intermediate data;

means for assigning a display priority to each linked content item of the information object and changing the display priority of the particular linked content item of an information object based upon a geometric relation of the particular linked content item to said visual field in the virtual space, wherein the geometric relation of the particular linked content item to the visual field in the virtual space is a relative relation comprising one or more of position, orientation, or scale ratio of the particular linked content item to the visual field in the virtual space;

first means for causing said plurality of intermediate data generating means to generate the respective pieces of intermediate data for displaying the particular linked content item of the information object displayed in the virtual space, according to the geometric relation of the particular linked content item to said visual field in the virtual space by comparing said changing display priority of the particular linked content item of the information object with a predetermined threshold for determining whether to generate a piece of intermediate data of the particular linked content item of the information object;

a memory for storing the generated pieces of intermediate data for rendering a display image; and second means for causing said plurality of different display image generating means to generate display images of said particular linked content item of the information object from said respective generated pieces of intermediate data, to render the display image on a display memory region, according to the geometric relation between said visual field and said particular linked content item of the information object by comparing said changing display priority of said particular linked content item of the information object with a predetermined threshold for determining whether to generate the display image of said particular linked content item of the information object.

2. The information processing apparatus according to claim 1 wherein each intermediate data generating means and each display image generating means operate asynchronously with each other for a respective content type of a particular linked content item of the information object.

3. The information processing apparatus according to claim 1 wherein each intermediate data generating means operates under control of said first means, to generate and renew a piece of intermediate data for displaying a particular linked content item of the information object, and each display image generating means operates simultaneously with each respective intermediate data generating means for the particular linked content item of the information object, under control of said second means, to generate a display image of the particular linked content item of the information object from said generated and renewed piece of intermediate data.

4. The information processing apparatus according to claim 1 wherein said holding means holds a plurality of information object content type specific data processing means, each information object content type specific data processing means including at least intermediate data generating means for generating a piece of intermediate data of a particular content type of a particular linked content item of an information object and display image generating means for generating a display image from the piece of intermediate data of the particular content type of the particular linked content item of the information object.

5. The information processing apparatus according to claim 1 wherein said holding means holds in an executable manner a plurality of different data processing means specific to said linked content items of different content types of the information object, each data processing means including corresponding one of said intermediate data generating means for generating a piece of intermediate data for a content type of a particular linked content item of the information object, corresponding one of said display image generating means, corresponding content data capturing means specific to said content type of the particular linked content item of the information object for capturing content data of said particular content type of the linked content item of the information object, and corresponding intermediate data deleting means specific to said content type of the particular linked content item of the information object for deleting said generated piece of intermediate data in said memory.

6. The information processing apparatus according to claim 1 wherein each intermediate data generating means is implemented as program codes, and each display image generating means is implemented as program codes; and said apparatus further comprises data capturing means for capturing said intermediate data generating program codes and said display image generating program codes into said holding means from an external device or a communication line.

7. The information processing apparatus according to claim 1 further comprising:

visual field data managing means for smoothly changing said visual field data according to an input command; and display means for displaying the generated display images of said particular linked content item of the information object.

8. The information processing apparatus according to claim 1 wherein:

said holding means further holds a plurality of different intermediate data deleting means specific to said respective different content types of linked content items of the information object for deleting said respective generated pieces of intermediate data;

said information processing apparatus further comprises managing data for a plurality of linked content items of an information object, and means for assigning display priorities to respective ones of said plurality of linked content items of the information object and changing the display priority of a particular linked content item of an information object based upon the geometric relation between said visual field and said particular linked content item of the information object;

said first means comparing said display priority of a particular linked content item of an information object with a predetermined threshold to thereby determine whether to generate or renew a piece of intermediate data of said particular linked content item of the information object;

said first means causing corresponding one of said intermediate data generating means to generate or renew said piece of intermediate data of said particular linked content item of the information object when the display priority of said particular linked content item of the information object is higher than the predetermined threshold;

said first means causing corresponding one of said data deleting means to delete said piece of intermediate data of said particular linked content item of the information object in said memory when the display priority of said particular linked content item of the information object is lower than a predetermined threshold;

said first means deleting managing data of said particular linked content item of the information object in said memory when the display priority of said particular linked content item of information object is lower than a predetermined threshold.

9. The information processing apparatus according to claim 1 wherein each display image generating means determines a form in which a generated display image is displayed, according to a particular linked content item display priority based upon the geometric relation between said visual field and the particular linked content item.

10. The information processing apparatus according to claim 1 wherein display priorities are assigned to respective ones of a plurality of linked content items of an information object, and when a display image of a particular linked content item of the information object is to be displayed, a corresponding one the display image generating means determines a form in which said display image of said particular linked content item of the information object is to be displayed according to a display priority of said particular linked content item of the information object, and wherein the display priority of a particular linked content item of an information object is changed based upon the geometric relation of said particular linked content item to said visual field in the virtual space.

11. The information processing apparatus according to claim 1 further comprising:

a memory region of said memory for storing therein display data including the pieces of intermediate data for displaying a plurality of linked content items of an information object; and memory managing means for detecting an amount of said memory region occupied by said display data and time-sequentially deleting from said memory region at least part of the pieces of intermediate data not used for display image generation for a longest time.

12. The information processing apparatus according to claim 1 further comprising:

third means for selecting, based upon a linked content item display priority, one of a plurality of linked content items of an information object as a representative linked content item of the information object, defining said visual field by defining a geometric relation of said representative linked content item to said visual field, and changing the display priority of the representative linked content item based upon the geometric relation of the representative linked content item to the visual field;

said third means altering said representative linked content item, without changing the geometric relations of said plurality of linked content items of the information object to said visual field, as said visual field shifts in said virtual space;

said first means traversing linkages between said plurality of linked content items of the information object, starting with said representative linked content item, to thereby determine whether to generate a piece of intermediate data of a particular linked content item of the information object.

13. The information processing apparatus according to claim 12 wherein said third means selects one of said plurality of linked content items of the information object having a highest display priority as said representative linked content item.

14. A computer readable data storage storing at least one program for controlling a computing apparatus for displaying an information object in a virtual space according to visual field data, where the information object represents one or more respective linked content items of different content types, and where said visual field data defines a visual field in said virtual space, according to operations comprising:

storing, in an executable manner, a plurality of programs specific to said respective linked content items of different content types of the information object, each information object linked content item type specific program generating intermediate data specific to a content type of a linked content item of a particular information object, wherein said generated intermediate data comprises at least either of texture data or display form defining data, and each said program generating a display image specific to said linked content item type of the particular information object from said generated intermediate data;

assigning a display priority to each linked content items of the information object and changing the display priority of the particular linked content item of an information object based upon a geometric relation of the particular linked content item to said visual field in the virtual space, wherein the geometric relation of the particular linked content item to the visual field in the virtual space is a relative relation comprising one or more of position, orientation, or scale ratio of the particular linked content item to the visual field in the virtual space;

causing the intermediate data to be generated for displaying said particular linked content item of the information object, according to the geometric relation of said linked content item to said visual field in the virtual space by comparing said changing display priority of the particular linked content item of the information object with a predetermined threshold for determining whether to generate a piece of intermediate data of the particular linked content item of the information object;

storing, in a memory, the generated intermediate data for rendering a display image; and causing said particular linked content item of the information object to be displayed from said generated intermediate data, according to the geometric relation between said visual field and said linked content item of the information object, to render the display image on a display memory region by comparing said changing display priority of said particular linked content item of the information object with a predetermined threshold for determining whether to generate the display image of said particular linked content item of the information object.

15. The computer readable storage according to claim 14, wherein the process further comprises asynchronously performing the causing the intermediate data to be generated with the causing the display image to be generated.

16. The computer readable storage according to claim 14, wherein the process further comprises performing the causing the intermediate data to be generated or renewed simultaneously with the causing the display image to be generated.

17. The computer readable storage according to claim 14 wherein said storing comprises storing, in an executable manner, at least one information object linked content item type specific processing program, said at least one information object linked content item type specific processing program generating the intermediate data of the particular content type of the linked content item of the information object, and generating a display image of the particular content type of the linked content item of the information object.

18. The computer readable storage according to claim 14 wherein each information object linked content item type specific program captures information object linked content data of corresponding linked content item type, and deletes intermediate data of said corresponding linked content item type in the memory.

19. The computer readable storage according to claim 14 wherein each information object linked content item type specific program deletes said generated intermediate data from said memory; and
  said process further comprises:
  assigning display priorities to respective ones of a plurality of linked content items of an information object;
  comparing said display priority of said particular linked content item information object with a predetermined threshold to determine whether to generate or renew said intermediate data of said particular linked content item information object;
  causing said intermediate data of said particular linked content item of the information object to be generated or renewed, when the display priority of said particular linked content item of the information object is higher than the predetermined threshold;
  causing said intermediate data of said particular linked content item of the information object in said memory to be deleted, when the display priority of said particular linked content item of the information object is lower than a predetermined threshold.

20. The computer readable storage according to claim 14 wherein the process further comprises assigning display priorities to respective ones of a plurality of linked content items of an information object; the generating of the display image comprising, when the display image of said particular linked content item of the information object is to be displayed, determining a form in which said display image of said particular linked content item of the information object is displayed according to the display priority of said particular linked content item of the information object.

21. The computer readable storage according to claim 14 wherein the intermediate data generating comprises storing data for display including generated intermediate data for displaying a plurality of linked content items of an information object in said memory, and the process further comprises:
  detecting an amount of said memory occupied by said display data; and
  sequentially deleting in said memory at least part of the generated intermediate data not used for display image generation for a longest time.

22. The computer readable storage according to claim 14 wherein the process further comprises selecting one of a plurality of linked content items of an information object as a representative linked content item of the information object and defining said visual field by defining a geometric relation of said representative linked content item to said visual field, the selecting comprises altering said representative linked content item without changing the geometric relations of said plurality of linked content items of the information object to said visual field, as said visual field shifts in said virtual space,
  wherein said process further comprises traversing linkages between said plurality of linked content items of the information object, starting with said representative linked content item, to cause intermediate data of one of the plurality of linked content items of the information object to be generated.

23. A method of displaying, in a computing apparatus, an information object in a virtual space according to visual field data, where the information object represents one or more respective linked content items of different content types, and where said visual field data defines a visual field in said virtual space, said method comprising:
  processing data, specific to said respective linked content items of different content types, of the information object, by generating a piece of intermediate data specific to a content type of a particular linked content item of the information object, wherein said generated piece of intermediate data comprises at least either of texture data or display form defining data, and by generating a display image specific to said particular linked content item of the information object from said generated intermediate data;
  assigning a display priority to each linked content items of the information object and changing the display priority of the particular linked content item of an information object based upon a geometric relation of the particular linked content item to said visual field in the virtual space, wherein the geometric relation of the particular linked content item to the visual field in the virtual space is a relative relation comprising one or more of position, orientation, or scale ratio of the particular linked content item to the visual field in the virtual space;
  causing the piece of intermediate data to be generated for displaying said particular linked content item of the information object, according to the geometric relation of said particular linked content item to said visual field in the virtual space by comparing said changing display priority of the particular linked content item of the information object with a predetermined threshold for determining whether to generate the piece of intermediate data of the particular linked content item of the information object;
  storing, in a memory, the generated piece of intermediate data for rendering a display image; and
  causing said particular linked content item of the information object to be displayed from said generated intermediate data, according to the geometric relation between said visual field and said particular linked content item of the information object, to render the display image on a display memory region by comparing said changing display priority of said particular linked content item of the information object with a predetermined threshold for determining whether to generate the display image of said particular linked content item of the information object.

24. A computing apparatus that displays an information object in a virtual space according to visual field data, where the information object represents one or more linked content items of different types, and where the visual field data defines a visual field in the virtual space, the apparatus comprising:
  a computer readable medium to store a plurality of intermediate data generators, each corresponding to a different linked content item type of an information object to generate display intermediate data of the linked content items of different types of the information object, said generated intermediate data comprising at least either of texture data or display form defining data, and to store a plurality of display image generators, each corresponding to the linked different content item types of the information object to generate display images from corresponding generated display intermediate data of the linked content item types of the information object; and
  a controller controlling the apparatus to perform operations comprising:
  assigning a display priority to each linked content items of the information object,
  changing the display priority of a particular linked content item of the information object based upon a geometric relation of the particular linked content item to said visual field in the virtual space, wherein the geometric relation of the particular linked content item to the visual field in the virtual space is a relative relation comprising one or more of position, orientation, or scale ratio of the particular linked content item to the visual field in the virtual space, controlling one of the intermediate data generators corresponding to the particular linked content item type of the information object to generate display intermediate data to display the particular linked content item type of the information object, according to the geometric relation of the particular linked content item to said visual field in the virtual space by comparing said changing display priority of the particular linked content item of the information object with a predetermined threshold for determining whether to generate the display intermediate data of the particular linked content item of the information object, and controlling one of the display image generators corresponding to the particular linked content item type of the information object, to generate a display image of the particular linked content item type of the information object from the generated display intermediate data of the particular linked content item type of the information object, according to the geometric relation between the visual field and the particular linked content item of the information object, to render a display image on a display memory region by comparing said changing display priority of said particular linked content item of the information object with a predetermined threshold for determining whether to generate the display image of said particular linked content item of the information object.

* * * * *